(12) United States Patent
Nishi et al.

(10) Patent No.: US 7,625,545 B2
(45) Date of Patent: Dec. 1, 2009

(54) PROCESS FOR PRODUCING CARBON NANOTUBES BY ARC DISCHARGE

(75) Inventors: Yasuhiko Nishi, Tokyo (JP); Hirotaka Mukai, Tokyo (JP); Daisuke Ozamoto, Tokyo (JP)

(73) Assignee: JFE Engineering Corporation, Tokyo (JP)

( * ) Notice: Subject to any disclaimer, the term of this patent is extended or adjusted under 35 U.S.C. 154(b) by 661 days.

(21) Appl. No.: 10/519,294

(22) PCT Filed: Jun. 30, 2003

(86) PCT No.: PCT/JP03/08272

§ 371 (c)(1), (2), (4) Date: Jul. 25, 2005

(87) PCT Pub. No.: WO2004/002889

PCT Pub. Date: Jan. 8, 2004

(65) Prior Publication Data

US 2006/0005381 A1    Jan. 12, 2006

(30) Foreign Application Priority Data

| Jul. 1, 2002 | (JP) | 2002-192749 |
| Jul. 1, 2002 | (JP) | 2002-192750 |
| Oct. 25, 2002 | (JP) | 2002-310860 |
| Oct. 28, 2002 | (JP) | 2002-313277 |
| Feb. 7, 2003 | (JP) | 2003-051662 |

(51) Int. Cl.
*D01F 9/12* (2006.01)
*D01F 9/127* (2006.01)

(52) U.S. Cl. .................. 423/447.7; 423/447.1; 977/843; 977/844

(58) Field of Classification Search .................. 445/24, 445/25, 49–51; 423/447.1; 977/842, 844
See application file for complete search history.

(56) References Cited

U.S. PATENT DOCUMENTS

| 2002/0061638 A1 | 5/2002 | Takikawa et al. |
| 2004/0050686 A1 * | 3/2004 | Huang et al. ............. 423/447.1 |

FOREIGN PATENT DOCUMENTS

CN    1354130 A    6/2002

(Continued)

OTHER PUBLICATIONS

Patent Abstracts of Japan of JP 2004-224636 dated Aug. 12, 2004.

(Continued)

*Primary Examiner*—Mariceli Santiago
(74) *Attorney, Agent, or Firm*—Ladas and Parry LLP

(57) ABSTRACT

A process for producing a tape-like material uniformly containing highly pure single-walled or multi-walled carbon nanotubes and a tape-like material produced thereby; a high-performance field emission electrode including the tape-like material; and a process for producing the field emission electrode. The carbon nanotubes are synthesized by arc discharge, wherein an inert gas or inert gas-containing mixed gas is jetted onto a cathode having a carbon material from the inside of a hollow electrode (11) used as an anode, and simultaneously an arc is generated to form a path of arc discharge along a stream of the gas. At the same time, by relative movement of the electrodes, the cathode spot of the arc is moved on the cathode, and the synthesized carbon nanotubes are formed into a tape.

14 Claims, 26 Drawing Sheets

FOREIGN PATENT DOCUMENTS

| | | |
|---|---|---|
| EP | 1 209 714 A2 | 5/2002 |
| JP | 2000-203820 | 7/2000 |
| JP | 2001-35362 | 2/2001 |
| JP | 2002-190247 | 5/2002 |
| JP | 2001-172582 | 6/2002 |
| JP | 179417 | 6/2002 |
| JP | 2002-220215 | 8/2002 |
| JP | 2002-255524 | 9/2002 |
| JP | 2003-119012 | 4/2003 |
| JP | 2003-327422 | 11/2003 |
| JP | 2004-224636 | 8/2004 |
| WO | 02/41348 A1 | 5/2002 |
| WO | 02/47109 A2 | 6/2002 |
| WO | 02/070405 A1 | 12/2002 |

OTHER PUBLICATIONS

Patent Abstracts of Japan of JP 2003-327422 dated Nov. 19, 2003.
Patent Abstracts of Japan of JP 2003-119012 dated Apr. 23, 2003.
Masaya Kato et al.; "Continous Torch Arc Method for MWNT Synthesis"; Mar. 27, 2002; vol. 2; p. 547; 27-A-YC-8.
Yoshinori Ando et al., Production Method and . . . Nanotubes; 1999; vol, 39; pp. 31 to 41.
X. Zahao et al.; Preparation of High-Grade . . . Discharge; 1997; vol. 35; No. 6; pp. 775 to 781.
Walt A. De Heer et al.; A Carbon Nanotube . . . Source; Nov. 17, 1995; p. 1179-1180.

\* cited by examiner

FIG. 3
(b)
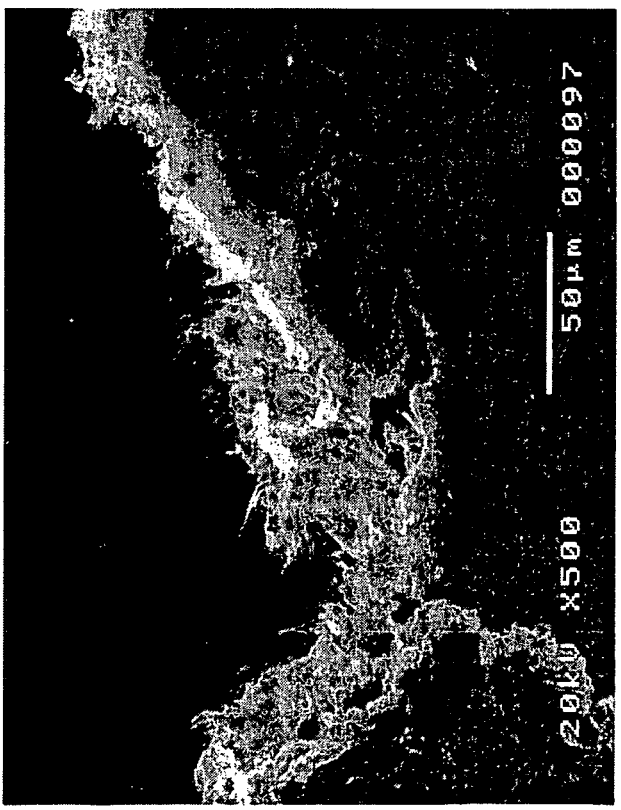
(a)

FIG. 6
NOT PREHEATED
(a) 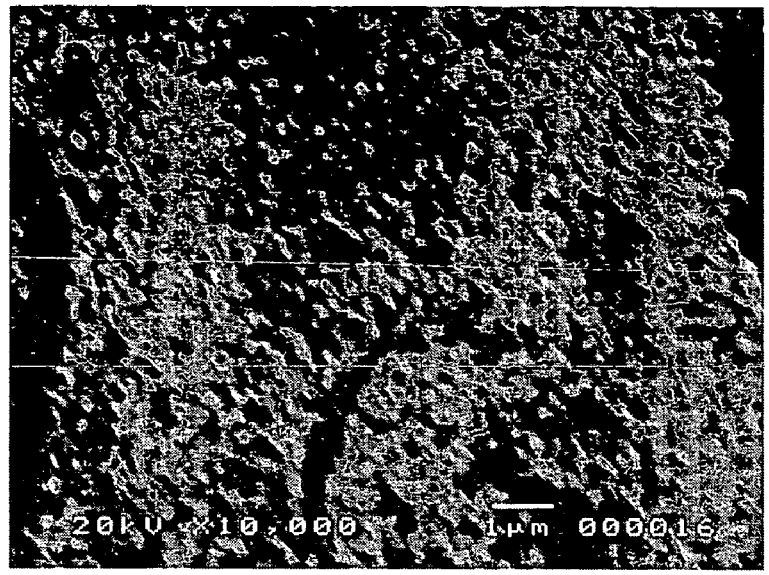
500°C
(b) 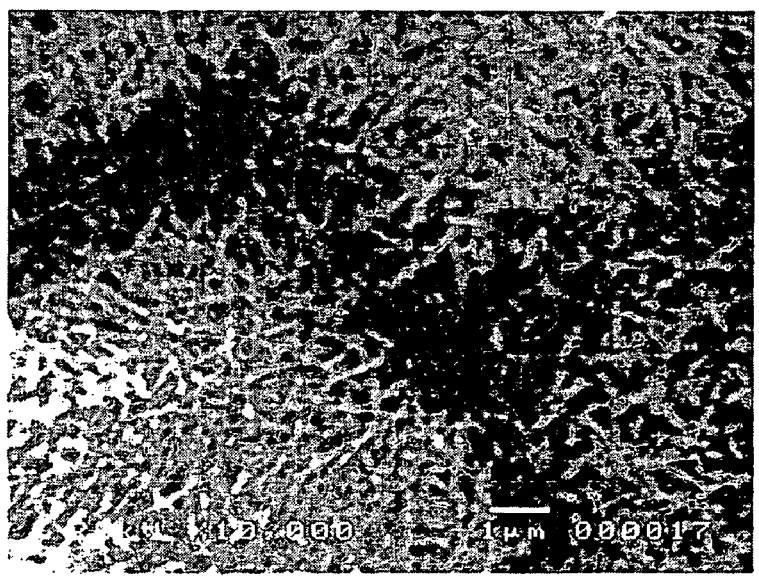

FIG. 7
2000°C
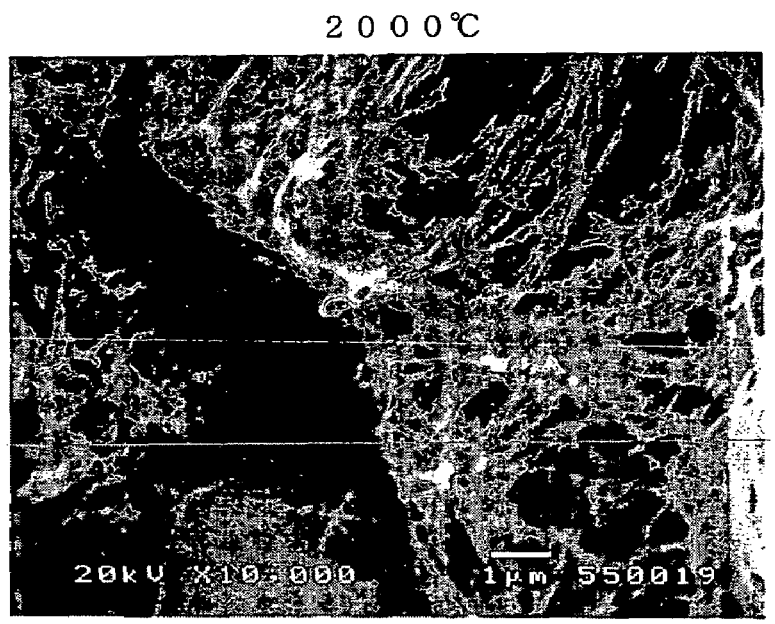
(a)
2500°C
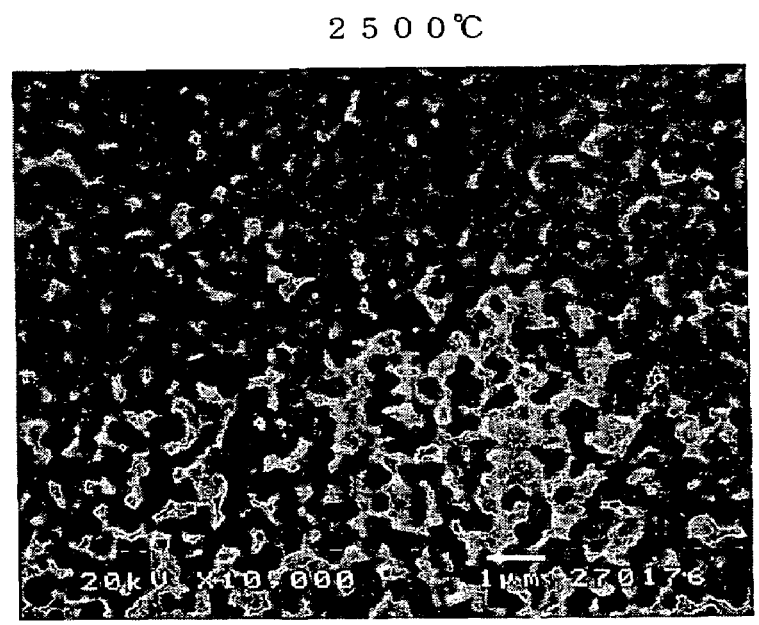
(b)

FIG. 8

| Carbon material | A | B | C | D | E | F | G |
|---|---|---|---|---|---|---|---|
| Volume density (g/cm³) | 1.66 | 1.75 | 1.85 | 1.68 | 1.78 | 1.70 | 1.75 |
| Shore hardness (HSC) | 65 | 35 | 60 | 65 | 90 | 100 | 50 |
| Specific resistance ($\mu\Omega \cdot cm$) | 5900 | 680 | 1200 | 2000 | 3500 | 4600 | 11000 |
| Bending strength (Mpa) | 28 | 24.5 | 63.7 | 44.1 | 60.8 | 58.5 | 29 |
| Ash content (%) | 0.32 | 0.1 | 0.08 | 0.2 | 0.3 | 0.1 | 0.3 |
| Thermal conductivity (W/m·K) | 23 | 162 | 128 | 85 | 52 | 31 | 20 |
| Forming method | extrusion | extrusion | CIP | Molding | Molding | Molding | Molding |
| Constituent | Carbon | Graphite | Graphite | Carbon + Graphite | Carbon + Graphite | Carbon | Carbon |
| CNT yield | ○ | × | △ | △ | △ | ○ | ○ |
| CNT purity | ○ | × | × | × | △ | ○ | ○ |

| Indication | ○: good | △: fair | ×: bad |
|---|---|---|---|

FIG. 12
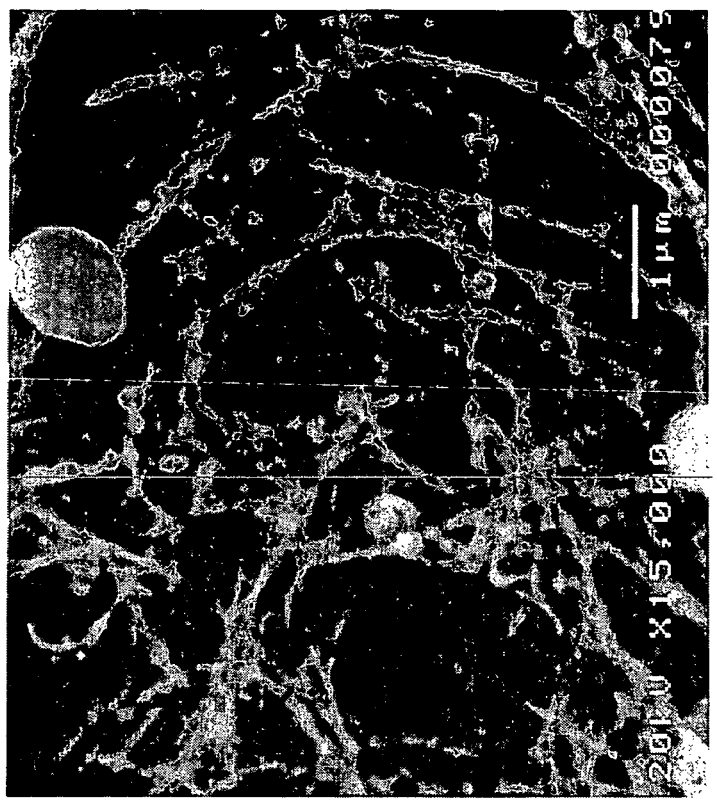
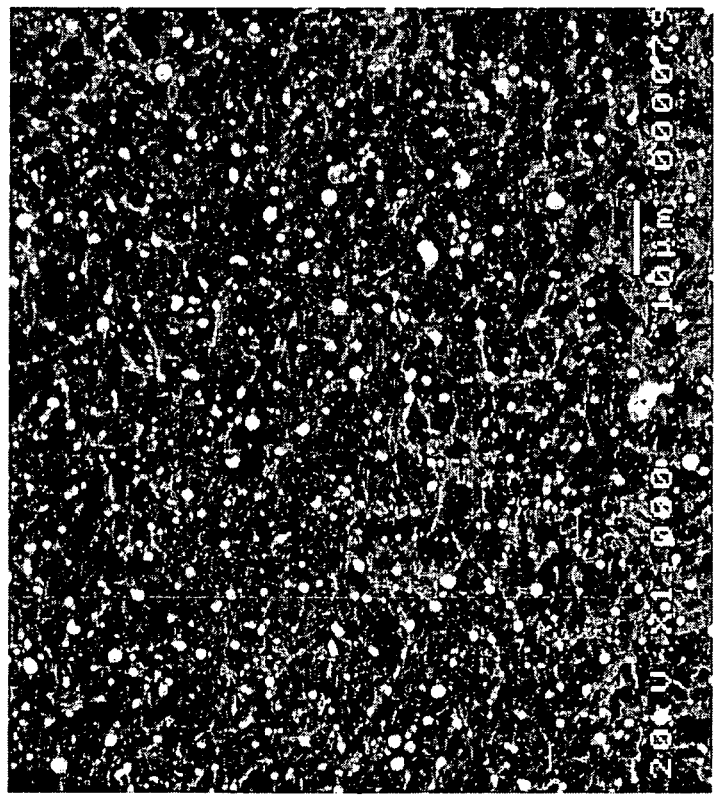

FIG. 20
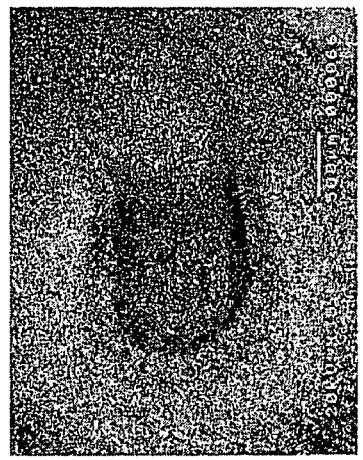
(a)
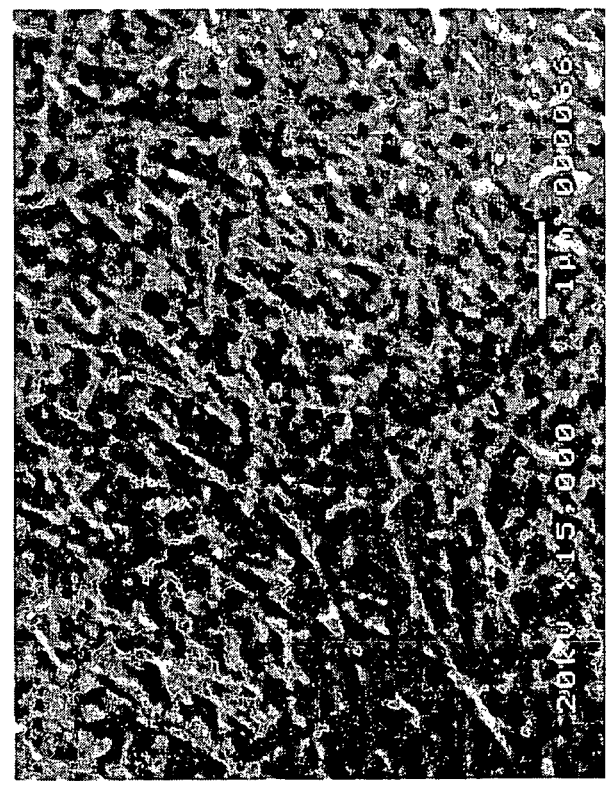
(b)
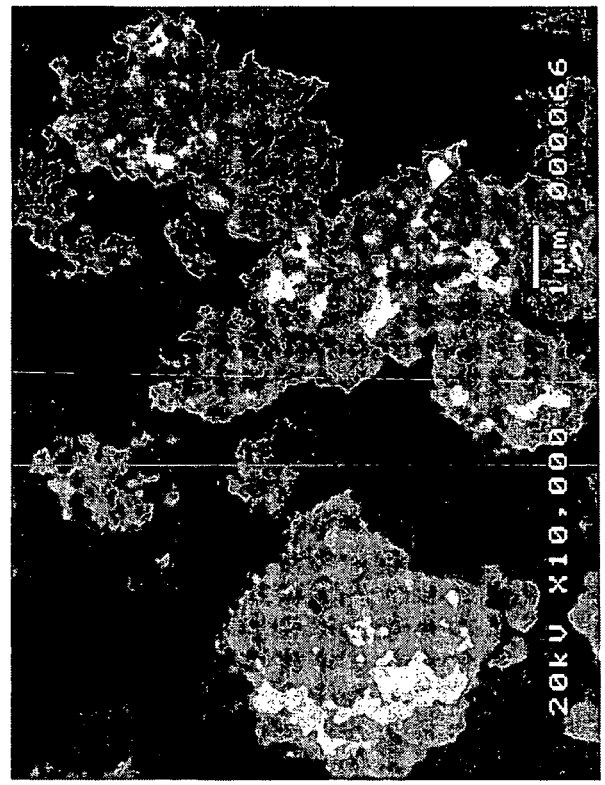
(c)

FIG. 21
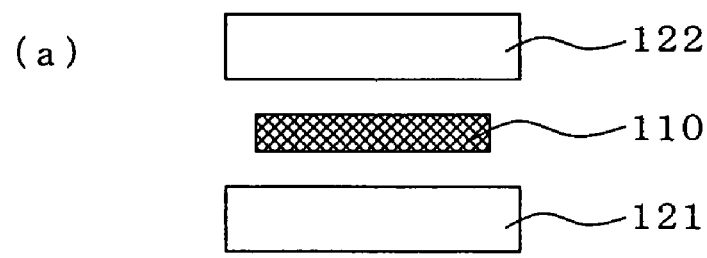
(a)
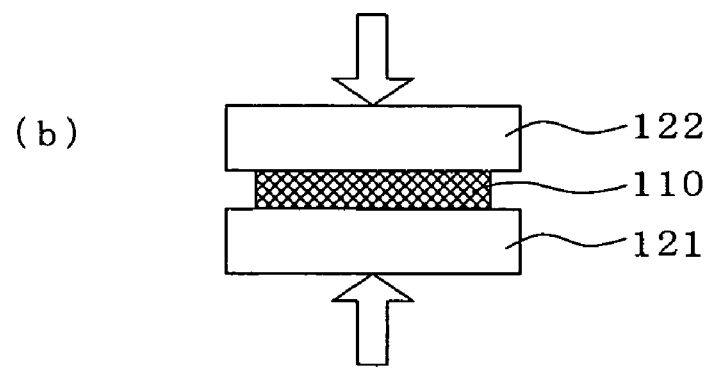
(b)
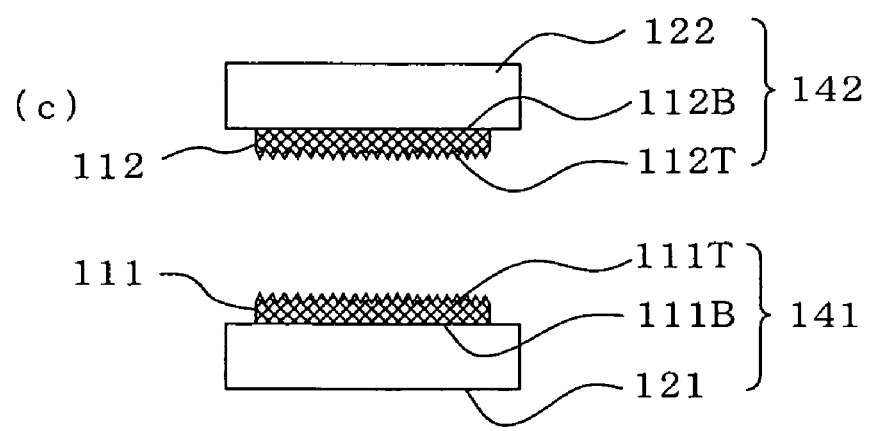
(c)

FIG. 27
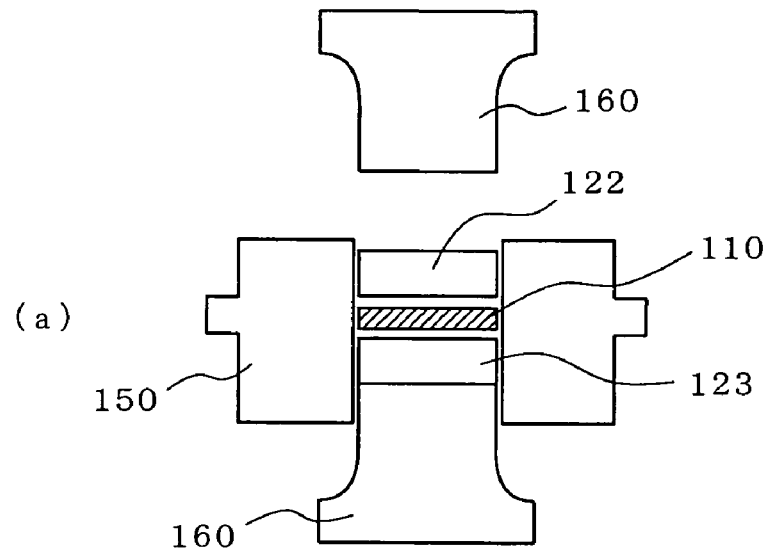
(a)
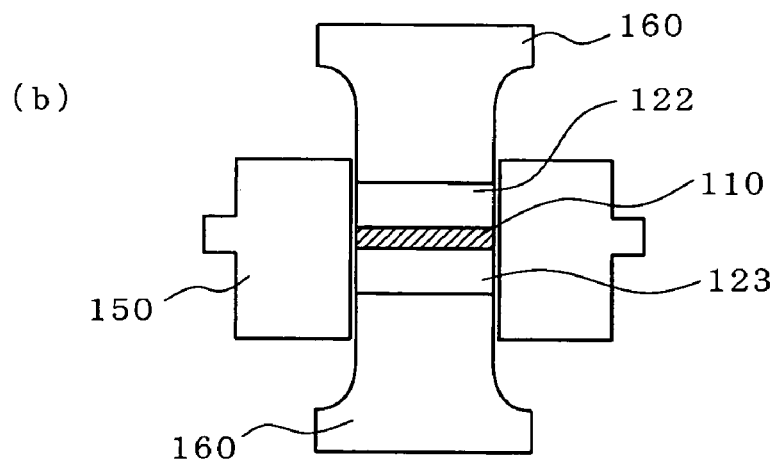
(b)
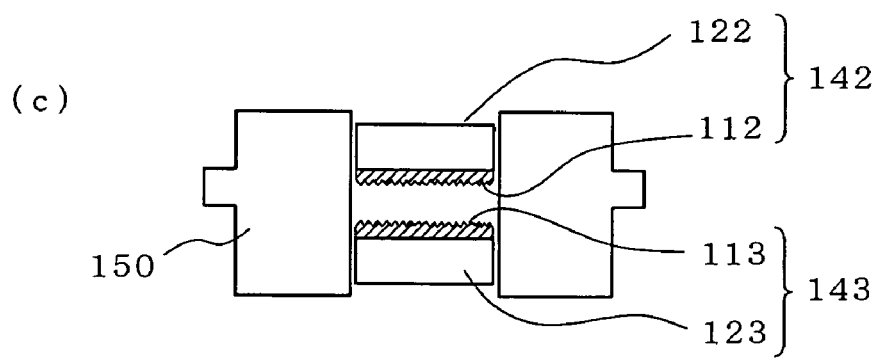
(c)

FIG. 28

Field emission property of electrode
(impressed voltage when a predetermined current density is obtained)

| Process of electrode production | | Impressed voltage |
|---|---|---|
| Known process | Paste containing carbon nanotube powder was printed on a substrate; surface was etched to expose carbon nanotubes. | 680V |
| Example 1 | Tape-like material was bonded with a silver paste. | 440V |
| Example 2 | Tape-like material was pinched between two substrates to apply pressure, and torn. | 210V |
| Example 3 | Tape-like material was pinched between a substrates and an indium block to apply pressure, and torn. | 192V |

PROCESS FOR PRODUCING CARBON NANOTUBES BY ARC DISCHARGE

TECHNICAL FIELD

The present invention relates to a process for producing a tape-like material containing highly pure multi-walled or single-walled carbon nanotubes and the highly pure multi-walled or single-walled carbon nanotubes. The invention also relates to a field emission electrode including the tape-like material containing the highly pure multi-walled or single-walled carbon nanotubes, and to a process for manufacturing the same.

BACKGROUND ART

Carbon nanotubes (CNT) are produced by arc discharge between two carbon materials, and are graphene sheets, in which carbon atoms are regularly arranged in a hexagonal form, rolled up into cylinders. A single-layer cylinder of a graphene sheet is referred to as a single-walled carbon nanotube (SWCNT), and its diameter is between 1 nm and several nanometers. A cylinder in which a plurality of graphene sheets are concentrically nested is referred to as a multi-walled carbon nanotube (MWCNT), and its diameter is between several nanometers and tens of nanometers. The single-walled carbon nanotube is conventionally synthesized by arc discharge using a carbon electrode containing a metal catalyst, or an anode in which a metal catalyst is embedded. The above-mentioned carbon material refers to an amorphous or graphitic conductive material principally containing carbon (the same applies to the following description).

In any case, various processes for synthesizing carbon nanotubes (CNT) by arc discharge between two carbon materials have been proposed. For example, a process has been proposed in which carbon nanotubes are produced by direct-current carbon arc discharge in an airtight chamber filled with helium or argon at an internal pressure of 200 Torr or more (for example, in Japanese Unexamined Patent Application Publication No. 6-280116).

Another process has also been proposed in which carbon nanotubes having uniform length and diameter distributions are produced by a direct-current arc discharge between carbon bar discharge electrodes in an airtight chamber filled with helium, with the internal temperature controlled in the range of 1,000 to 4,000° C. (for example, Japanese Unexamined Patent Application Publication No. 6-157016).

In view of: (a) achieving continuous collection of deposit on the cathode, which is generally collected in a batch process; (b) preventing the arc from becoming unstable as the deposit grows; (c) preventing decrease in yield resulting from long-time arc exposure of the deposit on the cathode; and (d) producing carbon nanotubes over a large area of the surface of the cathode, a process has been proposed in which carbon nanotubes are produced by arc discharge between opposing electrodes which are horizontally disposed in an airtight chamber filled with an inert gas, and which are relatively turned or reciprocated, continuously or intermittently (for example, Japanese Unexamined Patent Application Publication No. 7-216660).

Another process has also been proposed in which graphite fibers are produced on an disk-shaped cathode by arc discharge in an atmosphere containing at least one gas selected from among air, oxygen, and nitrogen, with the cathode continuously or intermittently rotated (for example, Japanese Unexamined Patent Application Publication No. 2002-88592).

A technique for increasing the purity and yield of carbon nanotubes has also been proposed in which opposing carbon anode and cathode disposed in an airtight chamber are heated by a surrounding heater before arc discharge between the electrodes (for example, Japanese Unexamined Patent Application Publication No. 2000-203820.

A technique efficiently producing carbon nanotubes having a uniform length and quality also has been proposed in which the tip of the anode constituted by a carbon electrode disposed in an airtight chamber is heated by heating means before arc discharge (for example, Japanese Unexamined Patent Application Publication No. 2000-344505).

These processes cited above, however, have the following technical disadvantages.

Specifically, although carbon nanotubes are produced in a substance constituted of carbon atoms deposited on the carbon cathode of the arc discharge portion, or in part of soot which flied off and deposited in the vicinity of the arc, the above-cited known processes for producing carbon nanotubes cannot prevent the presence of substances other than carbon nanotubes, such as graphite and amorphous carbon, in the product, and the carbon nanotube content in the product is low, accordingly.

In general arc discharge, its cathode spot occurs selectively in an area having a high electron emission property. The electron emission from the cathode spot gradually decreases, and the cathode spot moves to another area having a higher electron emission property. Thus, an arc is generally discharged while the cathode spot is moving irregularly and vigorously. In some cases, the cathode spot largely deviates from the area opposing the anode to increase load beyond the voltage limit of the power supply, and consequently arc is extinguished. In the arc discharge in which the cathode spot moves irregularly and vigorously, chemical factors, such as temperature and carbon vapor density, in an area of the cathode largely vary with time. Accordingly, synthesis conditions are varied, so that carbon nanotubes may be easily produced in a certain time period, but may be hardly produced or become liable to decompose in another time period. Consequently, carbon nanotubes containing a large amount of impurities are produced over the areas where the cathode spot occurred. The decomposition of carbon nanotubes herein means a phenomenon that their carbons structurally change into a form of graphite or amorphous carbon when they are, in a certain temperature range, more stable in a form of graphite or amorphous carbon than in a form of carbon nanotube, or that a group (cluster) of the carbon atoms constituting the produced carbon nanotubes are released to decompose the carbon nanotubes at a fairly high temperature, although it cannot be said definitively because the mechanism of production of carbon nanotubes has not yet been clear completely. Since production process of carbon nanotubes itself is performed at a high temperature, the cluster is probably released during the production. At temperatures optimum for production of carbon nanotubes, however, carbon nanotubes are produced probably because the production speed of carbon nanotubes are higher than the decomposition speed (cluster release speed).

In the known processes, therefore, equipment for arc discharge is disposed in an airtight chamber in which the constituent and pressure of the atmospheric gas and the temperature around the electrodes are appropriately selected and controlled, as described above, in order to stabilize the arc and increase the production rate of carbon nanotubes.

Unfortunately, it is difficult to completely fix the cathode spot only by adjusting the constituent and pressure of the atmospheric gas and the internal temperature or temperature around the electrodes in the airtight chamber. Accordingly, the resulting carbon nanotubes are collected only in deposit on the cathode or soot which is a mixture of a large amount of impurities and the carbon nanotubes. Consequently, the yield of the carbon nanotubes is reduced, and a complicated purification process is required to increase the purity of the carbon nanotubes. Thus, production cost is increased. Furthermore, the size of equipment is increased to raise equipment costs and make difficult mass production of carbon nanotubes by arc discharge.

In one of the above-described processes, the electrodes are relatively moved in order to produce carbon nanotubes continuously with a high density in a high yield. However, this process is still intended to continuously collect the deposit on the cathode, containing a large amount of impurities. High-density carbon nanotubes can be produced in some cases by increasing relative speed. However, the resulting carbon nanotubes have a thickness of about 100 μm, and are difficult to collect even with a blade-like scraper or the like. In the electrode-moving process, the electrodes are repeatedly moved in the same region, and consequently the temperature of the cathode gradually increases, so that the temperature history at the arc generation point is changed. It is therefore impossible to constantly produce high-purity carbon nanotubes in a high yield.

The carbon nanotube is expected to be used for cathode materials of fluorescent display tubes, field emission displays (FED), and the like and electron microscope probes, as field emission electron sources because of their nanofibrous structure and high crystallinity. However, since the known processes produce carbon nanotubes in a powder or aggregate form containing a large amount of impurities, the purification process is troublesome, and handling or processing is also troublesome.

When carbon nanotubes are compressed, or immersed in a liquid and then dried, they are aggregated by van der Waals force. Accordingly, the carbon nanotubes are formed into an aggregate or a thick bunch through, for example, grinding in a purification step or treatment with an acid solution, and consequently the nanofibrous structure of the carbon nanotubes is lost. If carbon nanotubes are formed into an aggregate or a thick bundle, so that they cannot have a nanofibrous structure, the capability to serve as a field emission electron source is considerably degraded.

Carbon nanotubes produced by arc discharge generally have higher crystallinity and higher quality than carbon nanotubes produced by thermal decomposition. However, it is impossible to directly synthesize a carbon nanotube film on a substrate of silicon or the like by an arc process because arc temperature is high. For such a film, it is therefore necessary to adopt thermal decomposition, or to thinly spread carbon nanotube powder produced by arc discharge and bond it in some way. Unfortunately, thermal decomposition cannot provide high-quality carbon nanotubes. Also, if carbon nanotube powder produced by a known arc discharge process is used, the powder is not uniformly distributed on the substrate and unevenness occurs, disadvantageously.

In order to uniformly put powder or aggregate of carbon nanotubes on a substrate or an electrode to use as an electron source for field emission, a method is applied in which the carbon nanotubes are dispersed in a conductive paste (for example, silver paste) and applied onto the substrate or electrode, followed by drying and firing, and the resulting surface is then polished or treated with laser light or plasma so as to expose the carbon nanotubes at the surface. It is however difficult that this method provides stable quality suitable as a field emission electron source, and the method makes the production process complicated and sophisticated, thus increasing production costs.

DISCLOSURE OF INVENTION

The object of the present invention is to produce a uniform and high-density tape-like material containing highly pure multi-walled or single-walled carbon nanotubes, to make it possible to easily produce highly pure multi-walled or single-walled carbon nanotubes by arc discharge in a normal atmosphere without using any airtight chamber, to produce a high-performance carbon nanotube field emission electrode from the tape-like material, and to make it possible to easily produce the field emission electrode.

(1) A tape-like material containing carbon nanotubes according to the present invention is produced by arc discharge.

(2) A tape-like material containing carbon nanotubes according to the present invention has a thickness in the range of 10 to 500 μm, a width in the range of 1 to 10 mm, and an arbitrary length, principally has flocculated carbon nanotubes.

(3) A tape-like material containing carbon nanotubes according to the present invention is synthesized by forming a path of arc discharge along the stream of a gas supplied from an anode to a cathode comprising a carbon material, and simultaneously by relatively moving the anode and the cathode so as to move a cathode spot of an arc on the cathode.

(4) A tape-like material containing carbon nanotubes according to the present invention is synthesized by generating an arc along the stream of a gas supplied from the inside of a hollow anode to a cathode comprising a carbon material, and simultaneously by relatively moving the anode and the cathode so as to move a cathode spot of the arc on the cathode.

(5) A tape-like material containing carbon nanotubes according to the present invention is synthesized by generating an arc along the stream of a gas supplied together with a metal or metal compound powder catalyst from the inside of a hollow anode to a cathode comprising a carbon material, and simultaneously by relatively moving the anode and the cathode so as to move a cathode spot of the arc on the cathode.

(6) The tape-like material containing carbon nanotubes according to the present invention is any one of the above-described (1) to (5), wherein arc discharge performed in a normal.

(7) The tape-like material containing carbon nanotubes according to the present invention is any one of the above-described (3) to (6), wherein the gas supplied from the anode to the cathode is argon or a mixture of argon gas and hydrogen gas.

(8) The tape-like material containing carbon nanotubes according to the present invention is any one of the above-described (1) to (7), wherein the anode and the cathode are relatively moved so that the arc generation point on the surface of the cathode has a substantially constant temperature history, except for positions of arc generation start and termination to synthesize the material.

(9) The tape-like material containing carbon nanotubes according the present invention is any one of the above-described (1) to (8), which is synthesized by moving the cathode spot so as not to be formed repeatedly in the same region at the surface of the cathode.

(10) The tape-like material containing carbon nanotubes according to the present invention is any one of the above-described (1) to (9), which is synthesized by performing arc discharge while the entire cathode, the cathode spot of the arc, or the front portion of an arc in an arc track on the cathode is heated.

(11) The tape-like material containing carbon nanotubes according to the present invention is any one of the above-described (1) to (10), which is produced by a synthesis using a carbon material having an electrical resistivity of 4,000 μΩ·cm or more, or a thermal conductivity of 40 W/m·K or less as the cathode.

(12) The tape-like material containing carbon nanotubes according to the present invention is any one of the above-described (1) to (11), which is produced by a synthesis using a carbon material having an arithmetic average surface roughness (Ra) of 3.2 μm or less as the cathode.

(13) The tape-like material containing carbon nanotubes according to the present invention is any one of the above-described (1) to (12), which is produced by a synthesis in which a gas is jetted onto a product produced on the locus of the cathode spot of the arc in a cooling step immediately after arc discharge.

Carbon nanotubes produced by general arc discharge are collected together with polycrystalline graphite and amorphous carbon being impurities in a deposited aggregate or a layered compound, or in soot flying to the surroundings. Since the product by such arc discharge is generally not easy to collect, or is collected together with a large amount of impurities, the subsequent purification requires various steps, such as pulverization, centrifugation, acid treatment, filtration, and oxidation burning. Also, since the purified carbon nanotubes are in powder form, subsequent handling and processing is complicated.

Since in the aspects (1) to (13), the tape-like material principally comprises flocculated highly pure carbon nanotubes and maintains its tape-like form, it is easy to collect, and collected carbon nanotubes are highly pure in their natural state.

Also, since the tape-like material maintains its tape-like form, handling and subsequent processing become easy extremely. For example, for an electron source of the cold cathode of a fluorescent display tube, part of the tape-like material is bonded to the end of cathode, and then polycrystalline graphite and amorphous carbon on the surface is removed if necessary. Thus, the process can be simplified.

(14) A field emission electrode according to the present invention includes the tape-like material containing carbon nanotubes of any one of (1) to (13). The tape-like material is pinched between substrates or bonded to a substrate.

(15) A tape-like material according to the present invention includes the tape-like material containing carbon nanotubes of any one of (1) to (13), wherein the tape-like material is torn by pinching between substrates or between a substrate and a material more deformable than the substrate to apply a pressure, and then separating the substrates or the substrate and deformable material. Thus, the field emission electrode has the torn tape-like material adhering to the substrate.

(16) In the field emission electrode according to the present invention, the tape-like material containing carbon nanotubes of any one of (1) to (13) is pinched such that the surface thereof which was opposed to the anode during synthesis is in contact with the substrate.

(17) A process for producing a field emission electrode according to the present invention includes the step of pinching the tape-like material containing carbon nanotubes of any one of (1) to (13) between substrates or bonding the tape-like material to a substrate with a conductive adhesive.

(18) A process for producing a field emission electrode according to the present invention includes the step of: pinching the tape-like material containing carbon nanotubes of any one of (1) to (13) between substrates or between a substrate and a material more deformable than the substrate to apply a pressure, and then separating the substrates or the substrate and deformable material. Thus, the field emission electrode has the torn tape-like material adhering to the substrate.

(19) In a process for producing a field emission electrode according to the present invention, the tape-like material containing carbon nanotubes of any one of (1) to (13) is pinched such that the surface thereof which was opposed to an anode during synthesis is in contact with the substrate.

In the tape-like material containing carbon nanotubes of the above-descried aspects (14) and (17), the carbon nanotubes are highly pure, and maintain the state just after being synthesized. Specifically, the carbon nanotubes are only in partial contact with one another and form into a uniform thin film, with their nanofibrous structure maintained. Therefore, the carbon nanotube film can be directly bonded to a substrate or an electrode, and thus used as a high-performance field emission electrode.

In the above-described aspects (15) and (18), by separating the substrate and the material more deformable than the substrate after pressure application, the intertwining carbon nanotube fibers contained in the tape-like material, adhering to the substrate and the deformable material are raveled out (pulled) to be broken. The broken carbon nanotube fibers are aligned in parallel with one another in the pulling direction. Hence, the torn surfaces of the tape-like material become fuzzy after the separation because the carbon nanotube fibers basically grow in the thickness direction of the tape-like material, its length is sufficiently long, and the fibers intricately intertwine. Thus, a field emission electrode exhibiting a superior electron emission property at the torn surface can be easily produced. Also, since the surface of the deformable material is deformed by pressure, the deformable material fits the shape of the substrate surface. Specifically, by the deformation of the deformable material, pressure is uniformly applied over the entire surface of the substrate, and a more uniform adhering surface of the carbon nanotubes can be obtained without variation in adhesion. Thus, a uniform adhesion can be established at the adhering surface of the substrate to the torn tape-like material.

In the tape-like material of the above-described aspects (16) and (19), the surface which was opposed to the anode during arc discharge has a higher adhesion to the substrate than the surface which was opposed to the cathode, and the deformable material has a higher adhesion to the carbon nanotubes than the substrate. Accordingly, by disposing the tape-like material such that the surface which was opposed to the anode comes in contact with the substrate, and the surface which was opposed to the cathode comes in contact with the deformable material, the adhesions at the interfaces can be substantially the same. Consequently, the tape-like material can be torn at the center of its thickness. In addition, the adhering surface of the carbon nanotubes becomes more uniform without variation in adhesion.

(20) In a process for producing carbon nanotubes according to the present invention, a path of arc discharge is formed along the stream of a gas supplied from an anode to a cathode comprising a carbon material.

(21) In a process for producing carbon nanotubes by arc discharge according to the present invention, an arc is generated while an inert gas or an inert gas-containing mixed gas is jetted onto a cathode comprising a carbon material from the inside of a hollow electrode used as an anode.

In the above-described aspects (20) and (21), arc discharge is performed while an inert gas, such as argon gas, or an inert gas-containing mixed gas is jetted onto the cathode from the anode. Consequently, the degree of ionization of the gas increases to produce conditions under which an arc is easily formed in the gas jetting path. It is also believed that the surface of the anode in contact with the inert gas-containing gas forms a stable anode spot. Thus, the arc generation path is constrained, so that the cathode spot is prevented from irregularly moving on the cathode. As a result, carbon nanotubes can be preferentially synthesized in the position (central area of the arc) where such a fixed cathode spot is formed, and thus highly pure multi-walled carbon nanotubes can be produced in this position (central area of the arc) where the fixed cathode spot is formed.

(22) In a process for producing carbon nanotubes according to the present invention, a path of arc discharge is formed along the stream of a gas supplied together with a metal powder or metal compound powder serving as a catalyst, from an anode to a cathode comprising a carbon material.

(23) In a process for producing carbon nanotubes by arc discharge according to the present invention, an arc is generated while an inert gas or an inert gas-containing mixed gas is jetted together with a metal powder or metal compound powder serving as a catalyst onto a cathode comprising a carbon material from the inside of a hollow electrode used as an anode.

In the above-described aspects (22) and (23), an inert gas, such as argon gas, or an inert gas-containing mixed gas is jetted together with a metal powder or metal compound powder serving as a catalyst onto the cathode from the anode. Consequently, the degree of ionization of the gas increases to produce conditions under which an arc is easily formed in the gas jetting path. Also, the surface of the anode in contact with the inert gas or inert gas-containing mixed gas forms a stable anode spot. Thus, the arc generation path is constrained, so that the cathode spot is prevented from irregularly moving on the cathode. As a result, carbon nanotubes can be preferentially synthesized in the position (central area of the arc) where such a fixed cathode spot is formed. At this stage, while the above-described aspects (20) and (21) provides only multi-walled carbon nanotubes because arc discharge occurs only with the anode and the cathode, aspects (22) and (23) can provide single-walled carbon nanotubes because a metal powder or metal compound powder catalyst is jetted together with the inert gas or inert gas-containing mixed gas onto the cathode from the anode so that the catalyst is superfinely atomized by arc heat and the atomized catalyst particles serve as the nucleus of the single-walled carbon nanotubes to grow. Specifically, the catalytic metal can be efficiently introduced to the position (central area of the arc) where a fixed cathode spot is formed, and thus highly pure single-walled carbon nanotubes can be synthesized in or around the central area of the arc. Preferably, the grain size of the metal powder of the catalyst is reduced as much as possible.

(24) In the process for producing carbon nanotubes according to the present invention, arc discharge is performed in a normal atmosphere, in any one of the above described (20) to (23).

For arc discharge, in the above-described aspect (24), the space between the electrodes needs to be ionized. There are various processes for ionization of atoms. In arc discharge, ionization is predominantly caused by electron collision. In general, inert gases except low-atomic number He and Ne, such as Ar, Kr, and Xe, are efficiently ionized by electron collision, and create a space where an arc is easily generated. The inert gas, such as Ar, Kr, or Xe has a higher ionization efficiency than oxygen, nitrogen, or the like. Therefore, if arc discharge is performed while such an inert gas or inert gas-containing mixed gas is supplied to the cathode from the anode in a normal atmosphere, as in the present invention, an arc can be generated, being concentrated along the gas flow. Specifically, by using the inert gas or inert gas-containing mixed gas supplied to the cathode from the anode as plasma gas, the arc is concentrated, and thus the cathode spot can be stabilized.

In a normal atmosphere, oxygen is taken into the arc generation area, thus causing oxidation and combustion of carbon. In this instance, the carbon nanotubes produced are oxidized to some extent, but impurities having lower combustion temperature, such as amorphous carbon and polycrystalline graphite, are preferentially oxidized and burned. As a result, the purity of the resulting carbon nanotubes is advantageously increased.

(25) In the process for producing carbon nanotubes according to the present invention, the gas flow rate of the inert gas or inert gas-containing mixed gas jetted onto the cathode from the inside of the hollow electrode is in the range of 10 to 400 mL/min per square millimeter of cross section of the bore of the hollow electrode, in any one of the above-described (21), (23), and (24).

In the above-described aspect (25), if the flow rate of the inert gas or inert gas-containing mixed gas supplied from the bore of the hollow electrode is excessively low, the gas cannot function as plasma gas efficiently. In contrast, an excessively high flow rate increases the concentration of the plasma gas in and around the central area of the electrode, and thus arc discharge can easily occur not only in the central area but also in its surroundings. Consequently the arc cannot be concentrated. Accordingly, by setting the flow rate of the inert gas or inert gas-containing mixed gas supplied from the bore of the hollow electrode in the range of 10 to 400 mL/min per square millimeter of cross section of the bore of the hollow electrode, the gas can function as plasma gas and create conditions under which arc discharge occurs in the central area of the anode rather than its surroundings. Consequently, the cathode spot can be concentrated so that highly pure carbon nanotubes are efficiently produced.

(26) In the process for producing carbon nanotubes according to the present invention, argon or a mixture of argon gas and hydrogen gas is used as the inert gas or inert gas-containing mixed gas, in any one of the above-described (20) to (25).

In the above-described aspect (26), inert gases having an atomic number higher than or equal to that of Ar, such as Ar, Kr, and Xe, are efficiently ionized by electron collision, and create a space where an arc is easily generated. In particular, since Ar is most inexpensive and industrially available, it helps reduce costs for producing carbon nanotubes. Also, by mixing several percent to tens of percent of $H_2$ into Ar, the yield of carbon nanotubes can be increased without adversely affecting the stability of the arc. This is probably because $H_2$ can prevent the sublimed carbon over the anode from growing to clusters, thus helping to create conditions for easily synthesizing carbon nanotubes on the cathode.

(27) In the process for producing carbon nanotubes according to the present invention, the cathode is preheated to a temperature in the range of 500 to 2,000° C. before arc discharge, in any one of the above described (20) to (26).

In the above-described aspect (27), if a general carbon electrode, that is, a carbon electrode having an electrical resistivity (specific resistance) in the range of 500 to 2,000 $\mu\Omega \cdot cm$, is used as the cathode, the cathode is preheated to 500 to 2,000° C. before arc discharge. Thus, the temperature of the cathode spot is increased in comparison with the case where preheating is not performed, and highly pure carbon nanotubes can be synthesized. A preheating temperature of 500°

C. or less does not produce much effect, and a preheating temperature of more than 2,000° C. causes the cathode carbon to evaporate vigorously and reduces the yield of carbon nanotubes.

(28) In the process for producing carbon nanotubes according to the present invention, the cathode electrode comprises a carbon material having an electrical resistivity of 4,000 μΩ·cm or more, or a thermal conductivity of 40 W/m·K or less, in any one of above-described (20) to (27).

In order to synthesize highly pure carbon nanotubes in a high yield, in the above-describe aspect (28), it is advantageous to increase the temperature of the cathode spot to some extent. Generally used carbon electrodes have an electrical resistivity (specific resistance) of about 500 to 2,000 μΩ·cm, as described above. If a carbon material with an electrical resistivity of 4,000 μΩ·cm or more is used as the cathode, the current density increases in the vicinity of the cathode spot of the cathode during arc discharge, and consequently the temperature in the vicinity of the cathode spot increases because of heat generation resulting from the electrical resistance. Thus, the same effect as in the case of preheating the cathode is produced, and accordingly highly pure carbon nanotubes can be produced in a high yield.

Generally used carbon electrodes have a thermal conductivity of 50 to 200 W/m·K. There is a substantially negative correlation between the electrical resistivity and the thermal conductivity of the carbon material. In other words, a material having a higher electrical resistivity has a lower thermal conductivity and conducts heat less, and consequently the temperature of the vicinity of the cathode spot is increased. A carbon material with an electrical resistivity of 4,000 μΩ·cm or more has a thermal conductivity of about 40 W/m·K or less.

(29) In a process for producing carbon nanotubes by arc discharge according to the present invention, a path of the arc discharge is formed along the stream of an inert gas or inert gas-containing mixed gas supplied from an anode to a cathode comprising a carbon material, and simultaneously, the anode and the cathode are relatively moved so as to move a cathode spot of an arc on the cathode.

In the above-described aspect (29), an inert gas, such as argon gas, or an inert gas-containing mixed gas is jetted onto the cathode from a hollow electrode used as the anode. Consequently, the degree of ionization of the gas increases to produce conditions under which an arc is easily formed in the gas jetting path. It is also believed that the internal surface of the hollow electrode in contact with the inert gas or inert gas-containing gas forms a stable anode spot. Thus, the arc generation path is constrained, so that the cathode spot is prevented from irregularly moving on the cathode. As a result, carbon nanotubes can be preferentially synthesized in the position (central area of the arc) where such a fixed cathode spot is formed, and thus carbon nanotubes can be produced in this position (central area of the arc) where the fixed cathode spot is formed. However, arc discharge repeatedly performed in the same region gradually reduces the yield per unit time of carbon nanotubes. This is probably because the synthesized multi-walled carbon nanotubes are exposed to an arc for a long time, so that a synthesis process of carbon nanotubes and its decomposition process simultaneously progress. By relatively moving the anode and the cathode so as to move the cathode spot of the arc on the cathode, the yield per unit time of multi-walled carbon nanotubes can be always maximized at an appropriate moving speed. In addition, the difference in thermal expansion coefficient between the carbon nanotubes and the aggregate of graphite and amorphous carbon being the raw material of the carbon electrode and impurities causes the carbon nanotubes to peel in a tape form, and thus makes it easy to collect the multi-walled carbon nanotubes. The collected tape-like carbon nanotubes can be easily bonded to any substrate. Specifically, uniform and highly pure multi-walled carbon nanotubes can be easily bonded to substrates.

(30) In a process for producing carbon nanotubes by arc discharge according to the present invention, an arc is generated while an inert gas or an inert gas-containing mixed gas is jetted onto a cathode comprising a carbon material from the inside of a hollow electrode used as an anode, and simultaneously, the anode and the cathode are relatively moved so as to move a cathode spot of the arc on the cathode.

In the above-described aspect (30), an inert gas, such as argon gas, or an inert gas-containing mixed gas is jetted onto the cathode from a hollow electrode used as the anode. Consequently, the degree of ionization of the gas increases to produce conditions under which an arc is easily formed in the gas jetting path. It is also believed that the internal surface of the hollow electrode in contact with the inert gas or inert gas-containing gas forms a stable anode spot. Thus, the arc generation path is constrained, so that the cathode spot is prevented from irregularly moving on the cathode. As a result, carbon nanotubes can be preferentially synthesized in the position (central area of the arc) where such a fixed cathode spot is formed, and thus carbon nanotubes can be produced in this position (central area of the arc) where the fixed cathode spot is formed. However, arc discharge repeatedly performed in the same region gradually reduces the yield per unit time of carbon nanotubes. This is probably because the synthesized multi-walled carbon nanotubes are exposed to an arc for a long time, so that a synthesis process of carbon nanotubes and its decomposition process simultaneously progress. By relatively moving the anode and the cathode so as to move the cathode spot of the arc on the cathode, the yield per unit time of multi-walled carbon nanotubes can be always maximized at an appropriate moving speed. In addition, the difference in thermal expansion coefficient between the carbon nanotubes and the aggregate of graphite and amorphous carbon being the raw material of the carbon electrode and impurities causes the carbon nanotubes to peel in a tape form, and thus makes it easy to collect the multi-walled carbon nanotubes. The collected tape-like carbon nanotubes can be easily bonded to any substrate. Specifically, uniform and highly pure multi-walled carbon nanotubes can be easily bonded to substrates.

(31) In a process for producing carbon nanotubes by arc discharge according to the present invention, an arc is generated while an inert gas or an inert gas-containing mixed gas is jetted together with a metal powder or metal compound powder serving as a catalyst onto a cathode comprising a carbon material from the inside of a hollow electrode used as an anode, and simultaneously, the anode and the cathode are relatively moved so as to move the cathode spot of the arc on the cathode.

In the above-described aspect (31), an inert gas, such as argon gas, or an inert gas-containing mixed gas is jetted together with the metal powder or metal compound powder serving as a catalyst onto the cathode from a hollow electrode used as the anode. Consequently, the degree of ionization of the gas increases to produce conditions under which an arc is easily formed in the gas jetting path. Also, the internal surface of the hollow electrode in contact with the inert gas or inert gas-containing mixed gas forms a stable anode spot. Thus, the arc generation path is constrained, so that the cathode spot is prevented from irregularly moving on the cathode. As a result, carbon nanotubes can be preferentially synthesized in the position (central area of the arc) where such a fixed cathode spot is formed. At this stage, while the above-described aspect (21) provides only multi-walled carbon nanotubes because arc discharge occurs only with the anode and the cathode, in the present aspect can provide single-walled carbon nanotubes because a metal powder or metal compound powder catalyst is jetted together with the inert gas or inert gas-containing mixed gas onto the cathode from the inside of the hollow electrode so that the catalyst is superfinely atomized by arc heat and the atomized catalyst particles serve as the nucleus of the single-walled carbon nanotubes to grow. Specifically, carbon nanotubes can be synthesized in the position (central area of the arc) where such a fixed cathode spot is formed. By relatively moving the anode and the cathode so as to move the cathode spot of the arc on the cathode, the yield per unit time of single-walled carbon nanotubes can be always maximized at an appropriate moving speed. In addition, the difference in thermal expansion coefficient between the carbon nanotubes and the aggregate of graphite and amorphous carbon being impurities causes the carbon nanotubes to peel in a tape form, and thus makes it easy to collect the single-walled carbon nanotubes. The collected tape-like carbon nanotubes in a tape form can be easily bonded to any substrate. Specifically, uniform and highly pure single-walled carbon nanotubes can be easily bonded to substrates. Preferably, the grain size of the metal powder jetted together with the gas is reduced as much as possible.

(32) In the process for producing carbon nanotubes according to the present invention, the cathode spot of the arc is relatively moved on the surface of the cathode material at a speed in the range of 10 to 1,000 mm/min, by relatively moving the anode and the cathode, in any one of the above-described (29) to (31).

In the above-described aspect (32), significantly slow movement at a relative moving speed of less than 10 mm/min does not lead to an appropriate range of temperature history even though various factors influencing the temperature history of the cathode surface are varied. Specifically, if an arc heat input is set so as to obtain a desired peak temperature, the speed of the subsequent cooling is significantly reduced. Consequently, the resulting carbon nanotubes are exposed to high temperature for a long time, and the purity is degraded. A relative moving speed of more than 1,000 mm/min does not also lead to an appropriate range of temperature history. For example, in order to obtain a desired peak temperature, the arc heat input per unit hour must be set large. However, a large arc heat input results in significant consumption of the anode, and thus makes long-time operation difficult. Also, the residence time in a range of temperatures around the peak temperature becomes short to reduce the thickness of the resulting carbon nanotubes, and consequently the tape-like material is not formed. By relatively moving the both electrodes so as to relatively move the cathode spot of the arc on the surface of the cathode material at a speed in the range of 10 to 1,000 mm/min, a tape-like material containing superior carbon nanotubes with a high density can be produced.

(33) In the process for producing carbon nanotubes according to the present invention, arc discharge is performed in a normal atmosphere, in any one of the above described (29) to (32).

For arc discharge, in the above-described aspect (33), the space between the electrodes needs to be ionized. There are various processes for ionization of atoms. In arc discharge, ionization is predominantly caused by electron collision. In general, inert gases except low-atomic number He and Ne, such as Ar, Kr, and Xe, are efficiently ionized by electron collision, and create a space where an arc is easily generated. The inert gas, such as Ar, Kr, or Xe has a higher ionization efficiency than oxygen, nitrogen, or the like. Therefore, if arc discharge is performed while such an inert gas or inert gas-containing mixed gas is supplied to the cathode from the anode in a normal atmosphere, as in the present invention, an arc can be generated, being concentrated along the gas flow. Specifically, by using the inert gas or inert gas-containing mixed gas supplied to the cathode from the anode as plasma gas, the arc is concentrated, and thus the cathode spot can be stabilized.

Specifically, the point of the present invention is two types of gases are used to achieve extremely concentrated, stable arc discharge, and the two type of gases are: the inert gas or inert gas-containing mixed gas serving as plasma gas for establishing the path of arc discharge; and a gas less ionized than the plasma gas, serving as the atmospheric gas. As a result, unprecedented tape-like material can be produced which contains highly pure carbon nanotubes with a high density.

In a normal atmosphere, oxygen is taken into the arc generation area, thus causing oxidation and combustion of carbon. In this instance, the carbon nanotubes produced are oxidized to some extent, but impurities having lower combustion temperature, such as amorphous carbon and polycrystalline graphite, are preferentially oxidized and burned. As a result, the purity of the resulting carbon nanotubes is advantageously increased.

The known process for synthesizing carbon nanotubes by arc discharge is performed in an inert gas or active gas atmosphere, that is, the same gas of the plasma gas or the atmospheric gas is used. Consequently, a satisfactory effect is not obtained though the arc is stabilized and the quality of the product is increased, to some extent depending on the gas used. Also, a tap-like material containing highly pure carbon nanotubes with a high density cannot be produced.

The arc discharge involves a shield gas. The shield gas is intended to shield the arc and the electrode in the vicinity of the arc from air, and a predetermined gas is jetted so as to cover the entire arc. Thus, it is used to easily produce an atmosphere of a predetermined gas in only the vicinity of the arc. Hence, the shield gas serves as the atmospheric gas in the known process.

(34) In the process for producing carbon nanotubes according to the present invention, the gas flow rate of the inert gas or inert gas-containing mixed gas jetted onto the cathode from the inside of the hollow electrode is in the range of 10 to 400 mL/min per square millimeter of cross section of the bore of the hollow electrode, in any one of the above-described (30) to (33).

In the above-described aspect (34), if the flow rate of the inert gas or inert gas-containing mixed gas supplied from the bore of the hollow electrode is excessively low, the gas cannot function as plasma gas efficiently. In contrast, an excessively high flow rate increases the concentration of the plasma gas in and around the central area of the anode, and thus arc discharge can easily occur not only in the central area but also in its surroundings. Consequently the arc cannot be concentrated. Accordingly, by setting the flow rate of the inert gas or inert gas-containing mixed gas supplied from the bore of the hollow electrode in the range of 10 to 400 mL/min per square millimeter of cross section of the bore of the hollow electrode, the gas can function as plasma gas and create conditions under which arc discharge occurs in the central area of the anode rather than its surroundings. Consequently, the cathode spot can be concentrated so that highly pure carbon nanotubes are efficiently produced.

(35) In the process for producing carbon nanotubes according to the present invention, argon or a mixture of argon gas and hydrogen gas is used as the inert gas or inert gas-containing mixed gas, in any one of the above-described (29) to (34).

In the above-described aspect (35), inert gases having an atomic number higher than or equal to that of Ar, such as Ar, Kr, and Xe, are efficiently ionized by electron collision, and create a space where an arc is easily generated. In particular, since Ar is most inexpensive and industrially available, it helps reduce costs for producing carbon nanotubes. Also, by mixing several percent to tens of percent of $H_2$ into Ar, the yield of carbon nanotubes can be increased without adversely affecting the stability of the arc. This is probably because $H_2$ can prevent the sublimed carbon over the electrode from growing to clusters, thus helping to create conditions for easily synthesizing carbon nanotubes on the cathode.

(36) In the process for producing carbon nanotubes according to the present invention, the anode and the cathode are relatively moved so that the arc generation point on the surface of the cathode has a substantially constant temperature history, except for positions of arc generation start and termination, in any one of above-described (29) to (35).

(37) In the process for producing carbon nanotubes according to the present invention, the cathode spot is moved so as not to be formed repeatedly in the same region on the surface of the cathode, in any one of the above-described (29) to (36).

(38) In the process for producing carbon nanotubes according to the present invention, arc discharge is performed while the entire cathode, the cathode spot of the arc, or the front portion of an arc in an arc track on the cathode is heated, in any one of the above-described (29) to (38).

It has been found through a variety of research that the essence of relative movement of the electrodes for efficiently synthesizing highly pure carbon nanotubes is to control the temperature history of the arc generation point on the surface of the cathode, on which the carbon nanotubes are produced, so as to be constant, as in the aspect (36).

It is considered that in the synthesis of carbon nanotubes by arc discharge, principally, carbon vapor and carbon ions generated from the carbon anode are diffused to the cathode side and condensed on the surface of the cathode having a lower temperature than the anode, thereby producing carbon nanotubes (particularly multi-walled carbon nanotubes). Therefore, in general, the lower the cathode temperature is, the higher the growing speed of carbon nanotubes is, and the cathode is not necessarily formed of carbon material as long as it is heat-resistant and conductive.

The inventors, however, has found through their experiments that the synthesis ratio of carbon nanotubes cannot be increased only by increasing carbon vapor and carbon ions from the anode, and that in order to produce highly pure carbon nanotubes, it is important to maintain the temperature of the cathode, on which carbon nanotubes are produced, in an appropriate range. Specifically, by moving the arc so as not to form the cathode spot repeatedly in the same region on the surface of the cathode, as in the above-described aspect (37), the temperature of the arc generation point continuously running on the cathode can be maintained substantially constant, and thus highly pure carbon nanotubes can be continuously synthesized.

It has also been found that by performing arc discharge while the entire cathode, the cathode spot of the arc, or the front portion of an arc in an arc track on the cathode is heated to an appropriate temperature, as in the above-described aspect (38), highly pure carbon nanotubes peeled in a tape form are synthesized.

The temperature of the cathode here refers to the temperature (thermal) history of the arc generation point on the surface of the cathode, including the highest temperature and temperature change rates in heating or cooling. It has been found that not only the temperatures around the peak temperature for carbon nanotube production, but also heating rate and cooling rate significantly influence the production of carbon nanotubes. For example, slow cooling causes the resulting carbon nanotubes to decompose or burn in a cooling step, thus reducing the yield of the carbon nanotubes. If the residence time in a range of temperatures around an appropriated peak temperature for carbon nanotube production is excessively short, carbon nanotubes cannot sufficiently grow to form a tape-like material. Heating rate also influences the subsequent peak temperature and cooling rate, and thus influences the production of carbon nanotubes. The temperature (thermal) history of the arc generation point on the surface of the cathode, on which carbon nanotubes are produced, significantly influences the production of carbon nanotubes, as described above. In order to stably produce carbon nanotubes with a high purity in a high yield, it is necessary to relatively move the electrodes so that the temperature history of the arc generation point on the surface of the cathode, on which carbon nanotubes are produced, is always constant. In other words, it is important to produce a quasi-stationary state in which a uniform temperature field is established, independently of time with respect to the moving arc generation point. The factors influencing the temperature history of the surface of the cathode mainly include physical properties, shape, size, and initial temperature of the cathode; arc heat input; and the number, moving speed, and moving path of arcs. Specifically, by setting the speed and path of the relative movement so as to obtain an appropriate temperature history of the arc generation point, according to the physical properties, shape, size, and initial temperature of the cathode, arc heat input, and the number of arcs, highly pure carbon nanotubes can be stably produced in a high yield, and consequently a tape-like material containing highly sure carbon nanotubes with a high density can be continuously produced.

In such a process that the cathode spot repeatedly moves in the same region, the temperature of the cathode is gradually increased, and thus the cooling rate at the arc generation point is reduced. Consequently, highly pure carbon nanotubes cannot be stably produced in a high yield. In the region on the surface of the cathode to which an arc is discharged, the physical properties and surface roughness may be changed. Even if the discharge conditions and moving speed are set constant, the distributions of the electrical resistance heating and the arc heat input are varied. Thus, the temperature history of the arc generation point cannot be constant, and the same results are obtained. In order to keep the temperature history of the arc generation point constant, the arc generation point is linearly moved only once on a plate with a substantially uniform width and thickness, or moved in a spiral on the periphery of a cylindrical cathode. These movements allow the arc generation point to obtain a substantially constant temperature history, except for positions of arc generation start and termination. Thus, by relatively moving the electrodes so as to provide an appropriate temperature history, the purity and yield of carbon nanotubes are increased over the entire line.

In addition, highly pure carbon nanotubes can densely aggregate to form continuous tape-like material, which has not been observed under conditions where carbon nanotubes grow sufficiently in the known process. Since the resulting tape-like material can peel from the cathode in its natural state, it is easily collected.

If the physical properties and surface roughness of the surface of the cathode are not changed, the cathode can be reused after the temperature distribution becomes uniform. If the physical properties or surface roughness of the surface of the cathode is changed, the cathode can be reused after the deformed portion is removed by grinding or polishing.

(39) In the process for producing carbon nanotubes according to the present invention, the cathode electrode comprises a carbon material having an electrical resistivity of 4,000 μΩ·cm or more or a thermal conductivity of 40 W/m·K or less, in any one of the above-described (29) to (38).

In order to synthesize highly pure carbon nanotubes in a high yield, in the above-describe aspect (39), it is advantageous to increase the temperature of the cathode spot to some extent. For this purpose, it is preferable to use a carbon material having a high electrical resistivity (specific resistance) and a low thermal conductivity, that is, a carbon material having a so-called low graphitization degree. Generally used carbon electrodes have an electrical resistivity (specific resistance) of about 500 to 2,000 μΩ·cm. If a carbon material with an electrical resistivity of 4,000 μΩ·cm or more is used as the cathode, the current density increases in the vicinity of the cathode spot of the cathode during arc discharge, and consequently the temperature in the vicinity of the cathode spot increases because of heat generation resulting from the electrical resistance. Thus, the same effect as in the case of heating the cathode is produced, and accordingly highly pure carbon nanotubes can be produced in a high yield.

Generally used carbon electrodes have a thermal conductivity of 50 to 200 W/m·K. There is a substantially negative correlation between the electrical resistivity and the thermal conductivity of the carbon material. In other words, a material having a higher electrical resistivity has a lower thermal conductivity and conducts heat less, and consequently the temperature of the vicinity of the cathode spot is increased. A carbon material with an electrical resistance of 4,000 μΩ·cm or more has a thermal conductivity of about 40 W/m·K or less.

(40) In the process for producing carbon nanotubes according to the present invention, a carbon material having an arithmetic average surface roughness (Ra) of 3.2 μm or less is used as the cathode, in any one of the above-described (29) to (39).

In the above-described aspect (40), it is believed that synthesized carbon nanotubes are peeled in a tape form in a cooling step after synthesis, by thermal stress mainly resulting from the difference in shrinkage ratio between the flocculate of the carbon nanotubes and the thin film and particles of polycrystalline graphite and amorphous carbon attached to the surfaces of the flocculate. Also, the thin film and particles of polycrystalline graphite and amorphous carbon attached to the surfaces of the tape-like product may be oxidized to burn in air in the synthesis and cooling steps, and thus the adhesion between the cathode and the tape-like material may be reduced.

However, a high surface roughness of the cathode material (arithmetic average surface roughness (Ra) of 4.0 μm or more) increases the adhesion between the cathode and the tape-like material, and separation does not occur easily. It is difficult to collect a tape-like material having a thickness 10 to 500 μm by mechanical scraping. Accordingly, by setting the arithmetic average surface roughness (Ra) of the carbon material serving as the cathode at 3.2 μm or less, the adhesion between the cathode and the tape-like material is weakened so that the separation occurs naturally due to thermal stress. Thus, the tape-like material can be easily collected.

(41) In the process for producing carbon nanotubes according to the present invention, the carbon nanotubes are produced in a synthesis in which a gas is jetted onto a product produced on the locus of the cathode spot of the arc in a cooling step immediately after arc discharge, in any one of the above-described (29) to (40).

(42) In the process for producing carbon nanotubes according to the present invention, the carbon nanotubes constitute an aggregate in a tape form, in any one of the above-described (29) to (41).

By jetting the gas onto the product to cool the product after carbon nanotubes are produced, as in the above-described aspect (41), the peeling of the product can be promoted. Any cooling gas except combustible gas, such as air or nitrogen, can be used as the jetting gas. The product is formed into a thin film on the surface of the cathode. It is believed that by jetting the gas onto the thin film, the temperature of the film more rapidly decreases than that of the cathode serving as the production substrate, so that thermal stress occurs between the product and the cathode. Thus, peeling significantly proceeds.

In addition, if the jetting gas contains oxygen, or if jetting gas does not contain oxygen, but is jetted in a normal atmosphere so that air is mixed with the gas to some extent by jetting the gas, the oxygen contained in the jetting gas helps to oxidize or burn thin coating or particles of polycrystalline graphite and amorphous carbon attached to the surfaces of the product. Consequently, the purity of the carbon nanotubes in the product peeled in a tape form is increased, and the adhesion between the cathode and the tape-like material is weakened so that the peeling of the tape-like material proceeds.

BRIEF DESCRIPTION OF THE DRAWINGS

FIG. 3 shows scanning electron micrographs (SEM photographs) of the central portion of a deposit on the cathode produced by the process for producing carbon nanotubes according to Embodiment 1.

FIG. 6 shows scanning electron micrographs (SEM photographs) of carbon nanotubes produced at a cathode spot, for describing a process for producing carbon nanotubes according to Embodiment 3 of the present invention in which the cathode is preheated.

FIG. 7 shows scanning electron micrographs (SEM photographs) of carbon nanotubes produced at the cathode spot, for describing the process for producing carbon nanotubes according to Embodiment 3 of the present invention in which the cathode is preheated.

FIG. 8 is a representation of the results of carbon nanotube synthesis with different carbon materials, illustrating a process for producing carbon nanotubes according to Embodiment 4 of the present invention.

FIG. 12 shows scanning electron micrographs (SEM photographs) of a carbon nanotube tape.

FIG. 20 shows scanning electron micrographs (SEM photographs) of the cathode spot observed when an arc is generated for a short time by general discharge.

FIG. 21 is a schematic illustration of a modification of the process for producing a field emission electrode including a carbon nanotube tape.

FIG. 27 is a schematic illustration of another modification of the process for producing a field emission electrode including a carbon nanotube tape.

FIG. 28 is a representation of a comparison in field emission property between the field emission electrode according to the present invention and a field emission electrode produced by a known process.

BEST MODE FOR CARRYING OUT THE INVENTION

Embodiment 1

The present invention will be further described using embodiments with reference to the drawings.

Figure 19:
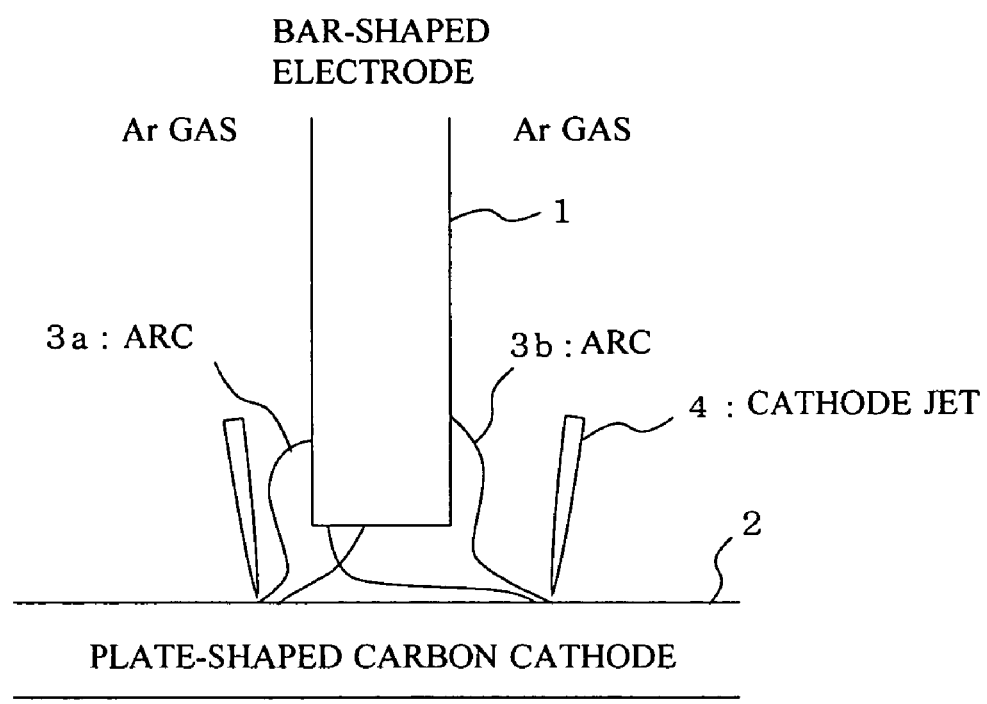
FIG. 19 is a schematic illustration of an arc discharge (general discharge) between carbon material electrodes in an argon gas atmosphere under atmospheric pressure.

FIG. 19 is a schematic illustration of an arc discharge (general discharge) between carbon material electrodes in an argon gas atmosphere under atmospheric pressure. An anode 1 is a bar-shaped carbon material, and a cathode 2 is a plate-shaped carbon material. As shown in FIG. 19, the area where an arc is generated largely moves and the cathode spot also moves irregularly and vigorously on the cathode plate (plate-shaped carbon material 2), in an argon gas atmosphere under atmospheric pressure (FIG. 19 shows two arcs 3$a$ and 3$b$ at different points of time). Reference numeral 4 represents cathode jets where carbon in the cathode evaporates, so that some of carbon atoms ionize. Such vigorous, irregular movement of the arc occurs notably in an argon gas atmosphere under atmospheric pressure, and similar movement is also observed in a helium or hydrogen gas atmosphere under low pressure.

FIG. 20 shows scanning electron micrographs (SEM photographs) of the cathode spot observed when an arc is generated for a short time by the general discharge shown in FIG. 19. (a) is an SEM photograph of the center of the cathode spot and the vicinity of the center, (b) is an enlarged SEM photograph of the center of the cathode spot, and (c) is an enlarged SEM photograph of an area around the cathode spot. These photographs clearly shows that while carbon nanotubes are closely produced in the central area of the cathode spot, only aggregates of amorphous carbon are deposited in the vicinity of the cathode spot. This means that while the cathode spot is under conditions satisfying requirements for synthesizing carbon nanotubes, its surroundings is under conditions not satisfying the requirements. Accordingly, it is believed that, in the general arc discharge in which the cathode spot moves irregularly and vigorously, the conditions satisfying the requirements for synthesizing carbon nanotubes and the other conditions are repeatedly alternate on the cathode, and consequently only deposit containing a large amount of amorphous carbon and other impurities is collected.

Figure 1:
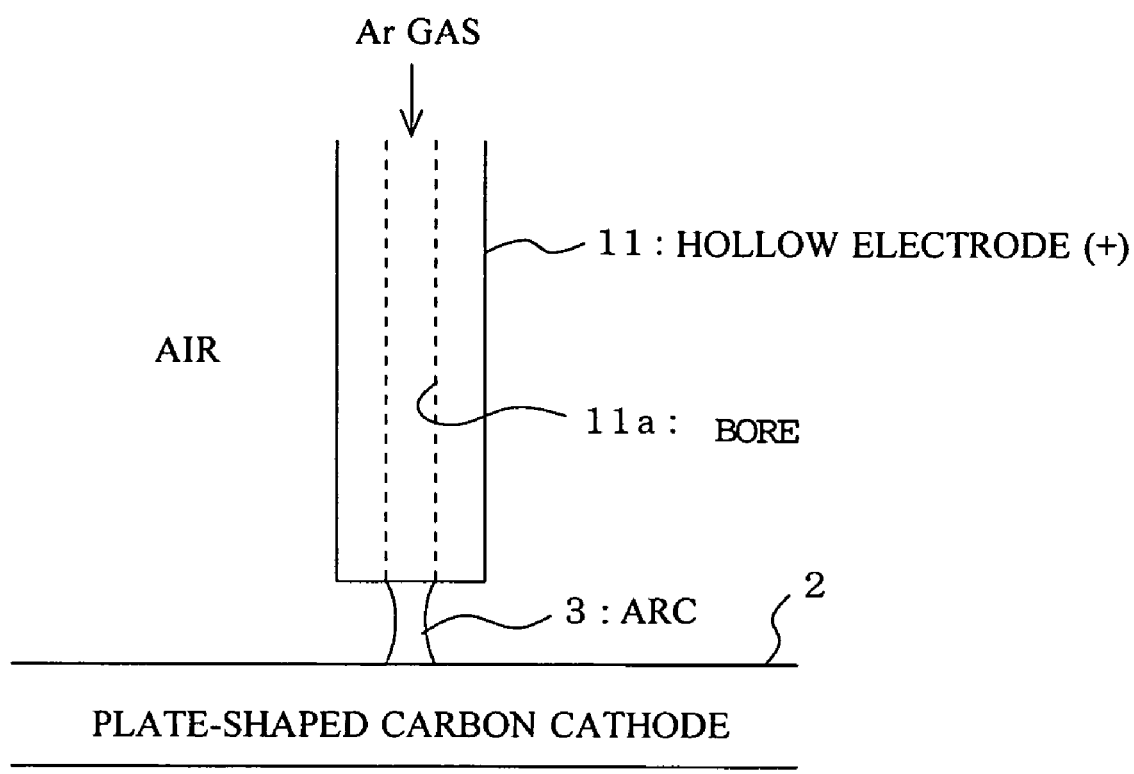
FIG. 1 is a schematic illustration showing an arc discharge between electrodes formed of a carbon material, performed in a process for producing carbon nanotubes according to Embodiment 1 of the present invention.

In view of this consideration, a hollow electrode 11 having a bore 11$a$ around its axis is used as the carbon material anode, and a small amount of argon gas is supplied through the bore 11$a$ of the hollow electrode 11 to an arc 3, in an open space (in an normal atmosphere under atmospheric pressure), as shown in FIG. 1. As a result, it has been found that an arc 3 is generated along the gas flow path with the cathode spot occurring at all times in an area opposing a gas jet. The reason why the arc is generated along the argon gas flow path is probably that the conductivity in the argon gas flow path increases more than its surroundings because the degree of ionization of the argon gas increases in an atmosphere of high temperature by arc discharge, and that the anode spot becomes stable and easy to form because the internal wall of the hollow electrode is in contact with the inert gas. The inert gas, such as argon gas, is efficiently ionized by electron collision, and creates a space where an arc is easily generated, as described above. Therefore, by starting to supply argon gas to the cathode 2 through the bore 11$a$ inside the hollow electrode 11 before an arc 3 is generated, the path for arc generation can be constrained to prevent the cathode spot of the arc from irregularly moving on the cathode 2 from the beginning of the arc generation. As a result, carbon nanotubes can be preferentially synthesized in the position (central area of the arc)

where a fixed cathode spot is formed from the beginning of the arc generation, and thus highly pure multi-walled carbon nanotubes can be produced in this position (central area of the arc) where the fixed cathode spot is formed.

The deposit on the cathode produced by stationary arc discharge with the hollow electrode 11 was observed with a scanning electron microscope (SEM), and it was found that highly pure carbon nanotubes can be synthesized at the cathode spot being the central area of the arc even by long-time arc discharge. Since the cathode jet as shown in FIG. 19 is not observed in the stationary arc discharge with the hollow electrode 11, carbon vapor generated from the cathode 2 is probably jetted to the same position as the arc column. It is thus believed that the synthesis effect of carbon nanotubes is increased by increasing the carbon atom concentration in the arc.

The hollow anode is not always made of carbon material, and may be a non-consumable electrode, such as a water-cooled copper electrode.

Figure 2:
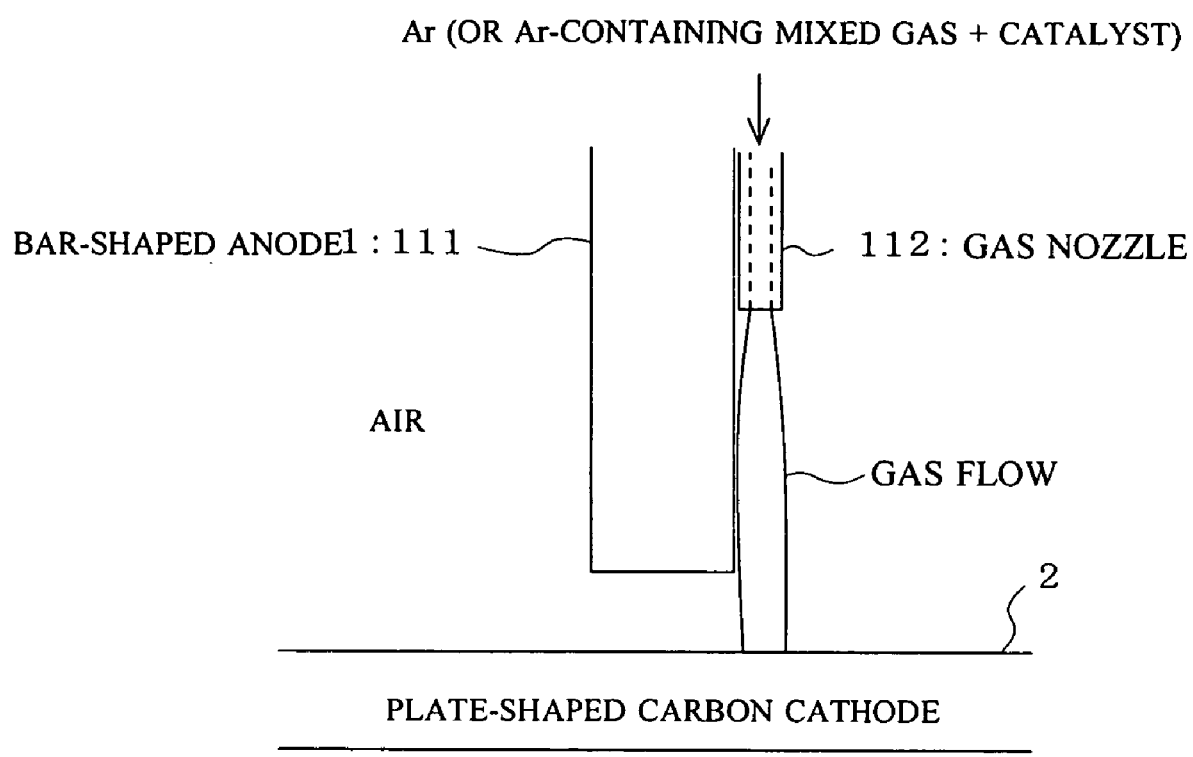
FIG. 2 is a schematic illustration of a modification of an anode used in the process for producing carbon nanotubes according to Embodiment 1 of the present invention.

The inert gas or inert gas-containing mixed gas flowing to the cathode from the anode may be delivered, for example, along a side surface of a bar-shaped anode 111 from a gas nozzle 112 additionally provided along the bar-shaped anode 111 to the cathode, as shown in FIG. 2. Such a manner can also generate an arc along a gas flow to fix the cathode spot, as long as the gas flow is sufficiently laminar. The same goes for the following embodiments.

The form or state of the arc was not varied even when the gas supplied through the bore 11a of the hollow electrode 11 was replaced with pure argon or a mixed argon gas containing about 5% of hydrogen or helium gas. In particular, by mixing several percent to tens of percent of hydrogen gas to argon, the yield of carbon nanotubes was increased without adversely affecting the stability of the arc. This is probably because hydrogen gas can prevent the sublimed carbon over the electrode from growing to clusters, thus helping to create conditions for easily synthesizing carbon nanotubes on the cathode. Appropriate gas flow rate depends on the cross section of the bore 11a of the hollow electrode 11, and is preferably in the range of 10 to 400 mL/min per square millimeter of cross section of the bore 11a.

Figure 5:
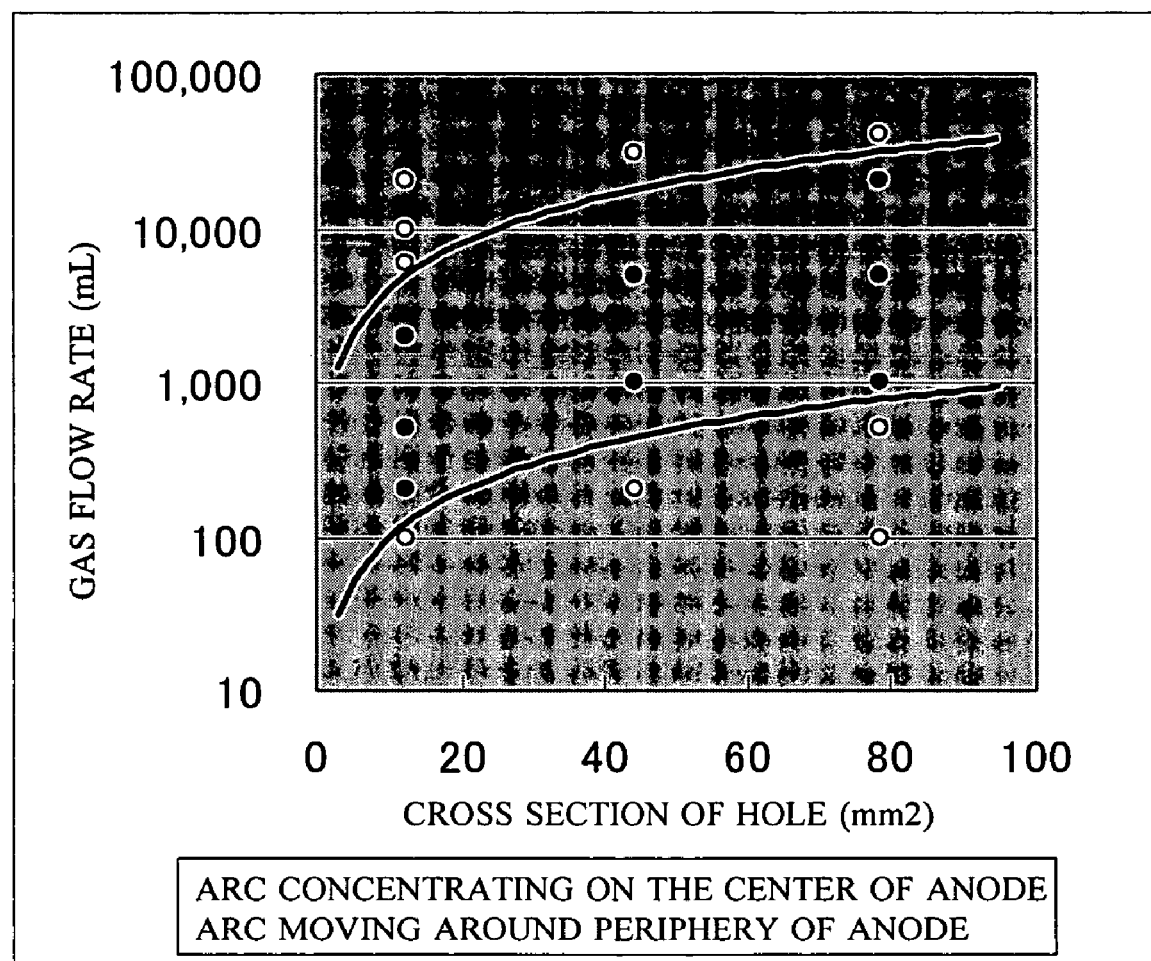
FIG. 5 is an experimental graph showing the relationship among the cross sectional area of the bore of a hollow electrode, the flow rate of gas passing through the hollow electrode, and the form or state of an arc generated.

FIG. 5 is an experimental graph showing the relationship among the cross section of the bore of the hollow electrode, the flow rate of gas passing through the hollow electrode, and the form or state of the arc generated. As shown in FIG. 5, if the flow rate of the pure argon gas or mixed argon gas containing about 5% of hydrogen or helium gas, supplied through the bore 11a of the hollow electrode 11 is excessively lower than 10 mL/min per square millimeter of cross section of the bore 11a, the gas does not sufficiently turn to plasma. In contrast, if the flow rate is excessively higher than 400 mL/min per square millimeter of cross section of the bore 11a, the concentration of plasma gas increases in and around the central area of the electrode, and thus arc discharge can easily occur not only in the central area but also in its surroundings so that the arc cannot be concentrated.

By setting the flow rate of the gas supplied through the bore 11a of the hollow electrode 11 in the range of 10 to 400 mL/min per square millimeter of cross section of the bore 11a of the hollow electrode 11, the gas can function as plasma gas and create conditions under which arc discharge occurs in the central area of the anode rather than its surroundings. Consequently, the cathode spot can be concentrated so that highly pure carbon nanotubes are efficiently produced.

Example

A hollow electrode with an outer diameter of 36 mm and an inner diameter of 10 mm was used as the anode. Arc discharge was performed for one minute at a current of 500 A and a voltage of 35 V (arc length: 5 mm) in a normal atmosphere under atmospheric pressure while argon gas containing 3% of hydrogen was supplied onto an cathode through the bore of the hollow electrode at a flow rate of 10 L/min.

FIG. 3 shows scanning electron micrographs (SEM photographs) of the central portion of a deposit on the cathode produced by the one-minute stationary arc discharge with the hollow electrode. These SEM photographs show that highly pure carbon nanotubes are produced in the central portion of the deposit on the cathode. The one-minute stationary arc discharge produced about tens of milligrams of highly pure multi-walled carbon nanotubes.

Embodiment 2

Figure 4:
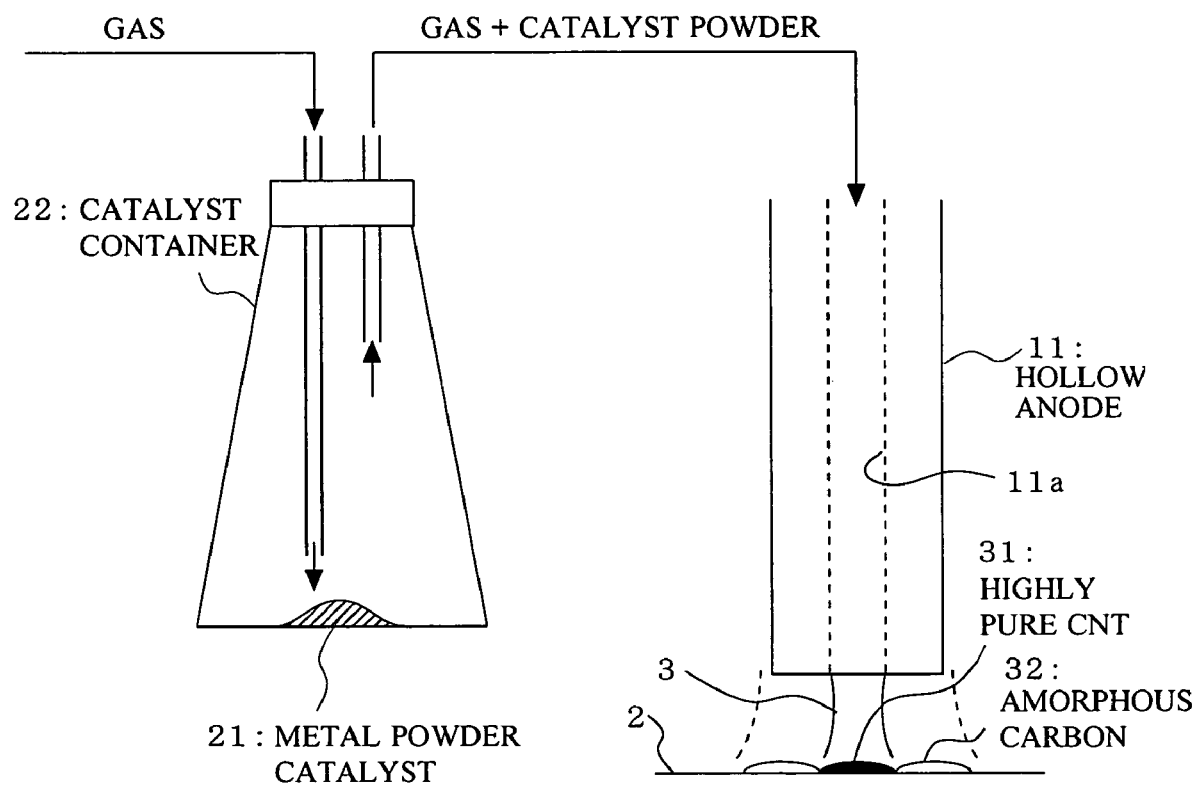
FIG. 4 is a schematic illustration showing an arc discharge between electrodes formed of a carbon material, performed in a process for producing carbon nanotubes according to Embodiment 2 of the present invention.

FIG. 4 illustrates a process for producing carbon nanotubes according to Embodiment 2 of the present invention. In the figure, the same parts as in FIG. 1 for Embodiment 1 are designated by the same reference numerals.

The process for producing carbon nanotubes according to the present embodiment is characterized in that a catalyst container 22 containing metal or metal compound powder 21 as a catalyst is connected to the same hollow electrode 11 as the anode in Embodiment 1, having a bore 11a around its axis and acting as the carbon material anode, and an arc 3 is generated in an open space (in a normal atmosphere under atmospheric pressure) while a small amount of inert gas, such as argon gas, or inert gas-containing mixed gas is jetted onto the cathode 2 through the catalyst container 22 and the bore 11a of the hollow electrode 11 together with the metal or metal compound powder catalyst 21.

In the present embodiment also, pure argon or a mixed argon gas containing about 5% of hydrogen or helium gas was used as the gas supplied through the bore 11a of the hollow electrode 11. In particular, by mixing several percent to tens of percent of hydrogen gas to argon, the yield of carbon nanotubes was increased without adversely affecting the stability of the arc. As described above, this is probably because hydrogen gas can prevent the sublimed carbon over the electrode from growing to clusters, thus helping to create conditions for easily synthesizing carbon nanotubes on the cathode.

In the present embodiment, as in Embodiment 1, the appropriate gas flow rate depends on the cross section of the bore 11a of the hollow electrode 11, and is preferably in the range of 10 to 400 mL/min per square millimeter of cross section of the bore 11a. By appropriately setting the flow rate of the gas, the gas can function as plasma gas and create conditions under which arc discharge occurs in the central area of the anode rather than its surroundings. Consequently, the cathode spot can be concentrated so that highly pure carbon nanotubes are efficiently produced.

Although any catalytic material can be used as the metal or metal compound powder, the present embodiment uses Fe, Ni, Co, FeS, and so forth singly or in combination.

In the present embodiment also, since the inert gas or inert gas-containing mixed gas is jetted onto the cathode 2 through the bore 11a of the hollow electrode 11, the conductivity in the gas flow path increases more than that in its surroundings because the degree of ionization of the inert gas or inert gas-containing mixed gas increases in an atmosphere of high temperature by arc discharge. Also, the anode spot is stably formed at the internal surface of the hollow electrode, and thus the generated arc is constrained to be along the gas flow path.

In addition, in the present embodiment, the metal or metal compound powder catalyst 21 is delivered along with the gas stream, and the catalyst is superfinely atomized by arc heat. The atomized catalyst particles serve as the nucleus from which single-walled carbon nanotubes grow. Specifically, highly pure single-walled carbon nanotubes can be produced in and around the position (central area of the arc) where a fixed cathode spot is formed.

Embodiment 3

FIGS. 6 and 7 show scanning electron micrographs (SEM photographs) of carbon nanotubes produced at the cathode spot, for describing a process for producing carbon nanotubes according to Embodiment 3 in which the cathode is preheated.

It is considered that in the synthesis of carbon nanotubes by arc discharge, principally, carbon vapor and carbon ions generated from the carbon anode are diffused to the cathode side and condensed at the surface of the cathode having a lower temperature than the anode, thereby producing carbon nanotubes (particularly multi-walled carbon nanotubes). Therefore, in general, the lower the cathode temperature is, the higher the growing speed of carbon nanotubes is, and the cathode is not necessarily formed of carbon material as long as it is heat-resistant and conductive.

The inventors, however, has found through their experiments that the synthesis ratio of carbon nanotubes cannot be increased only by increasing carbon vapor and carbon ions from the anode, and that in order to produce highly pure carbon nanotubes, it is important to maintain the temperature of the cathode, on which carbon nanotubes are produced, in an appropriate range. Specifically, it has been confirmed that by preheating the cathode to 500 to 2,000° C. with the same composition of electrodes and under the same conditions as in Embodiment 1 or 2 before arc discharge, highly pure carbon nanotubes can be synthesized with cathode spot temperature higher than that in the case where preheating is not performed.

More specifically, it has been found that carbon nanotubes are not produced in the case where preheating is not performed (FIG. 6(*a*)); a small amount of carbon nanotubes is produced in the case where preheating performed at 500° C. (FIG. 6(*b*)), showing a low preheating effect; a large amount of carbon nanotubes is produced in the case where preheating is performed at 2,000° C. (FIG. 7(*a*)); the yield of carbon nanotubes is reduced in the case where preheating is performed at 2,500° C. (FIG. 7(*b*)) because of vigorous evaporation of carbon from the cathode.

Embodiment 4

FIG. 8 is a representation of the results of carbon nanotube synthesis with different carbon materials, illustrating a process for producing carbon nanotubes according to Embodiment 4 of the present invention.

In order to synthesize highly pure carbon nanotubes in a high yield, it is advantageous to increase the temperature of the arc cathode spot on the cathode material to some extent, as described in Embodiment 3. Generally used carbon electrodes have an electrical resistivity (specific resistance) of about 500 to 2,000 μΩ·cm. If a carbon material with an electrical resistivity of 4,000 μΩ·cm or more is used as the cathode, the current density increases in the vicinity of the cathode spot of the cathode material during arc discharge, and consequently the temperature in the vicinity of the cathode spot increases because of heat generation resulting from the electrical resistance. Thus, the same effect as in the case of preheating the cathode is produced, and accordingly highly pure carbon nanotubes can be produced in a high yield.

Generally used carbon electrodes have a thermal conductivity of 50 to 200 W/m·K, showing a substantially negative correlation between the electrical resistivity and the thermal conductivity of the carbon material. In other words, a material having a higher electrical resistivity has a lower thermal conductivity and conducts heat less, and consequently the temperature of the vicinity of the cathode spot is increased. A carbon material with an electrical resistivity of 4,000 μΩ·cm or more has a thermal conductivity of about 40 W/mK or less.

In FIG. 8, some types of carbon material A to G constituted of carbon, graphite, and carbon+graphite are used, and arc discharge was performed with the same composition of electrodes under the same conditions as in Embodiment 1 or 2. The yield and purity of the resulting carbon nanotubes were rated in three levels (circle: good, triangle: fair, cross: bad). FIG. 8 shows that the use of general electrodes or carbon materials B, C, and D having an electrical resistivity (specific resistance) of about 500 to 2,000 μΩ·cm and a thermal conductivity of 40 W/m·K or more results in poor purity of carbon nanotubes, and that the use of carbon material B results in a poor yield and the use of carbon materials C and d results in fair yields. The use of carbon material E having an electrical resistivity (specific resistance) of more than 2,000 μΩ·cm and less than 4,000 μΩ·cm and a thermal conductivity of 40 W/m·K or more results in a fair yield and purity of carbon nanotubes.

In contrast, the use of carbon materials A, F, and G having an electrical resistivity (specific resistance) of 4,000 μΩ·cm or more and a thermal conductivity of 40 W/m·K or less results in superior yields and purities.

While the above-described embodiments perform arc discharge in an open space (in a normal atmosphere under atmospheric pressure), the arc discharge may be performed in an enclosure. For example, an enclosure is opened to the outside with a relief valve, and the relief valve allows the internal space of the enclosure to be under a constant pressure higher than atmospheric pressure. The air is forcibly introduced into the internal space of the enclosure to create an atmosphere of air. Thus, arc discharge is performed by jetting an inert gas, such as argon gas, or an inert gas-containing mixed gas onto the cathode through the internal space of a hollow electrode placed in the enclosure. Alternatively, arc discharge may be performed in the inside of the enclosure where the pressure is lower than atmospheric pressure.

Embodiment 5

Figure 9:
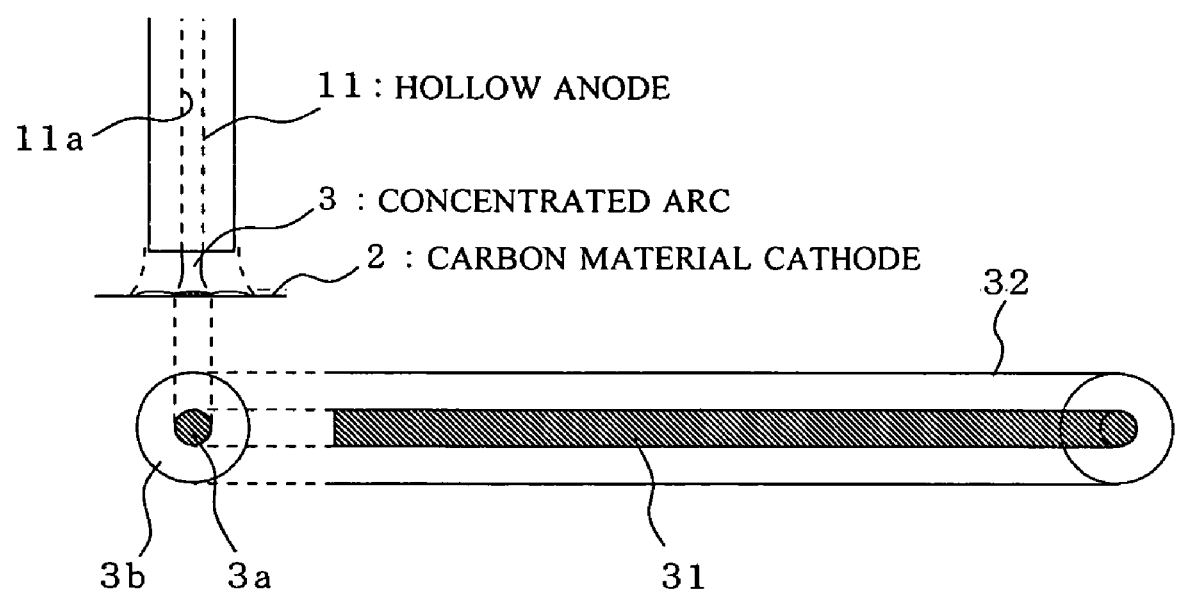
FIG. 9 is a representation of the fundamental principle of processes for producing a tape-like material containing carbon nanotubes and for producing the carbon nanotubes according to the present invention.

FIG. 9 is a representation of the fundamental principle of processes for producing a tape-like material containing carbon nanotubes and for producing the carbon nanotubes according to Embodiment 5 of the present invention.

Figure 10:
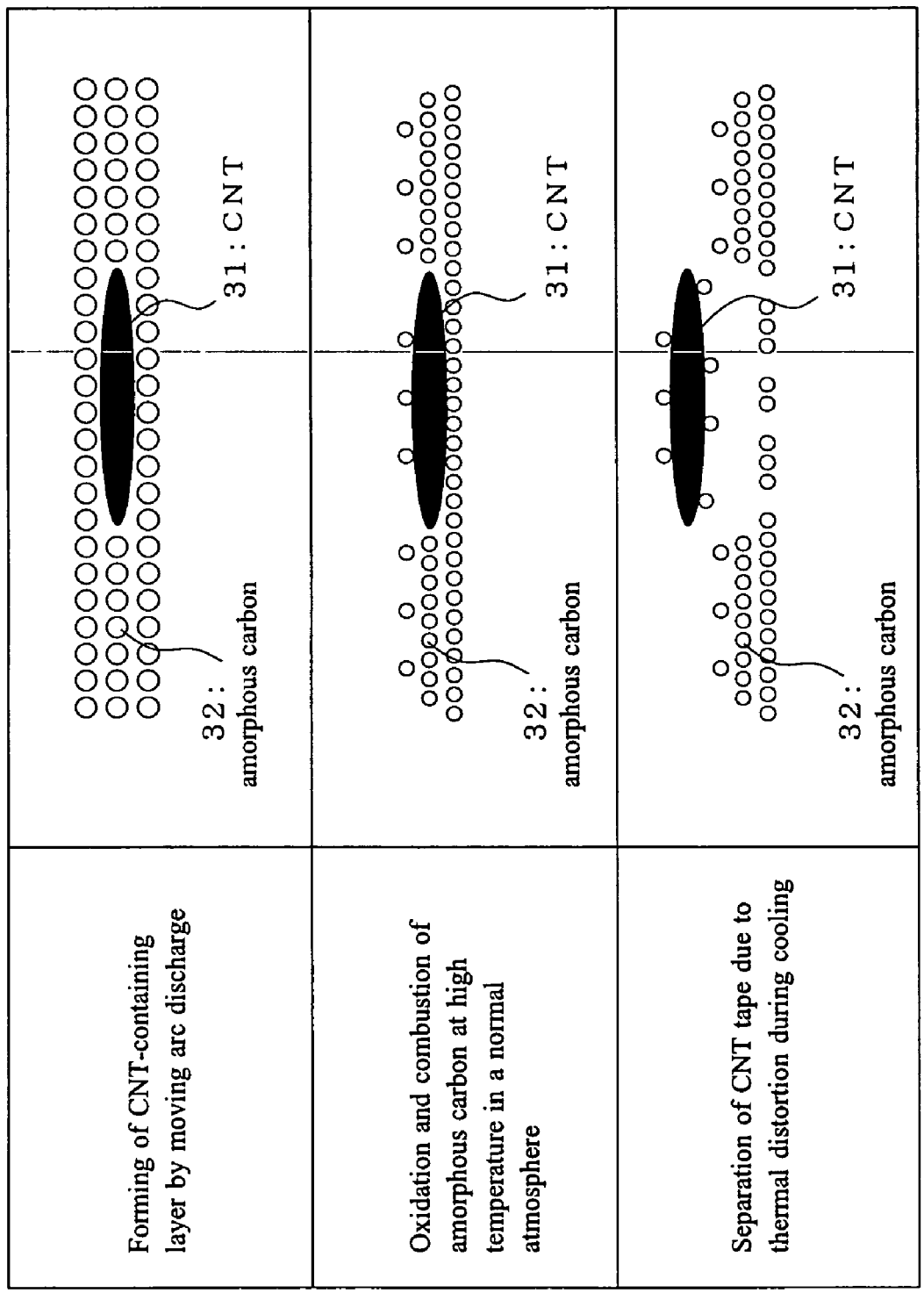
FIG. 10 is representation of the mechanism of carbon nanotube tape production.

A hollow electrode 11 having a bore 11*a* around its axis, as shown in FIG. 9, was used as the carbon material anode. As a result, it was observed that when arc discharge is performed by supplying a small amount of argon gas through the bore 11*a* of the hollow electrode 11 to an arc 3, in an open space (in a normal atmosphere under atmospheric pressure) with the hollow electrode 11 moving, a tape-like material was produced in the region of the cathode where the center 3*a* of the arc 3 (cathode spot) runs, and that the material was spontaneously peeled. This tape-like material was observed with a scanning electron microscope (SEM) and a transmission electron microscope (TEM), and it was thus found that the material was constituted of an aggregate of highly pure carbon nanotubes. It is believed that the production mechanism of the tape-like material, that is, a highly pure carbon nanotube tape (hereinafter referred to as highly pure CNT tape) 31 is such that FIG. 10 shows.

Specifically, the mechanism of synthesizing carbon nanotubes in the center 3a of the arc 3 (cathode spot) is the same as in the case where the stationary arc is used. However, since the moving arc produces amorphous carbon 32 in the surroundings 3b of the arc, the cross section of the area where the arc 3 moves is such that an aggregate of carbon nanotubes is surrounded by the amorphous carbon 32, as shown in the top row of FIG. 10. However, after the arc 3 has passed away, the amorphous carbon 32 comes into contact with air at a high temperature so that a part of the amorphous carbon 32 having many crystalline structural defects is preferentially oxidized and burned to destruct partially (middle row of FIG. 10). Then, while the cathode 2 is cooling down, highly pure carbon nanotubes separate in a form of a tape (bottom row of FIG. 10) due to the difference in thermal expansion coefficient between the amorphous carbon layer and the aggregate of the highly pure carbon nanotubes. Thus, the moving arc discharge with the hollow electrode 11 efficiently synthesizes highly pure carbon nanotubes and allows the tape-like aggregate of the highly pure carbon nanotubes to be easily collected.

Example

A hollow electrode with an outer diameter of 36 mm and an inner diameter of 10 mm was used as the anode, and arc discharge was performed for one minute at a current of 500 A and a voltage of 35 V (arc length: 5 mm) in a normal atmosphere under atmospheric pressure while argon gas containing 3% of hydrogen was supplied onto an cathode through the bore of the hollow electrode at a flow rate of 10 L/min, as in Embodiment 1.

The one-minute stationary arc discharge produced about tens of milligrams of highly pure multi-walled carbon nanotubes, as shown in the scanning electron micrographs (SEM photographs) (a) and (b) of the above-described FIG. 3.

Figure 11:
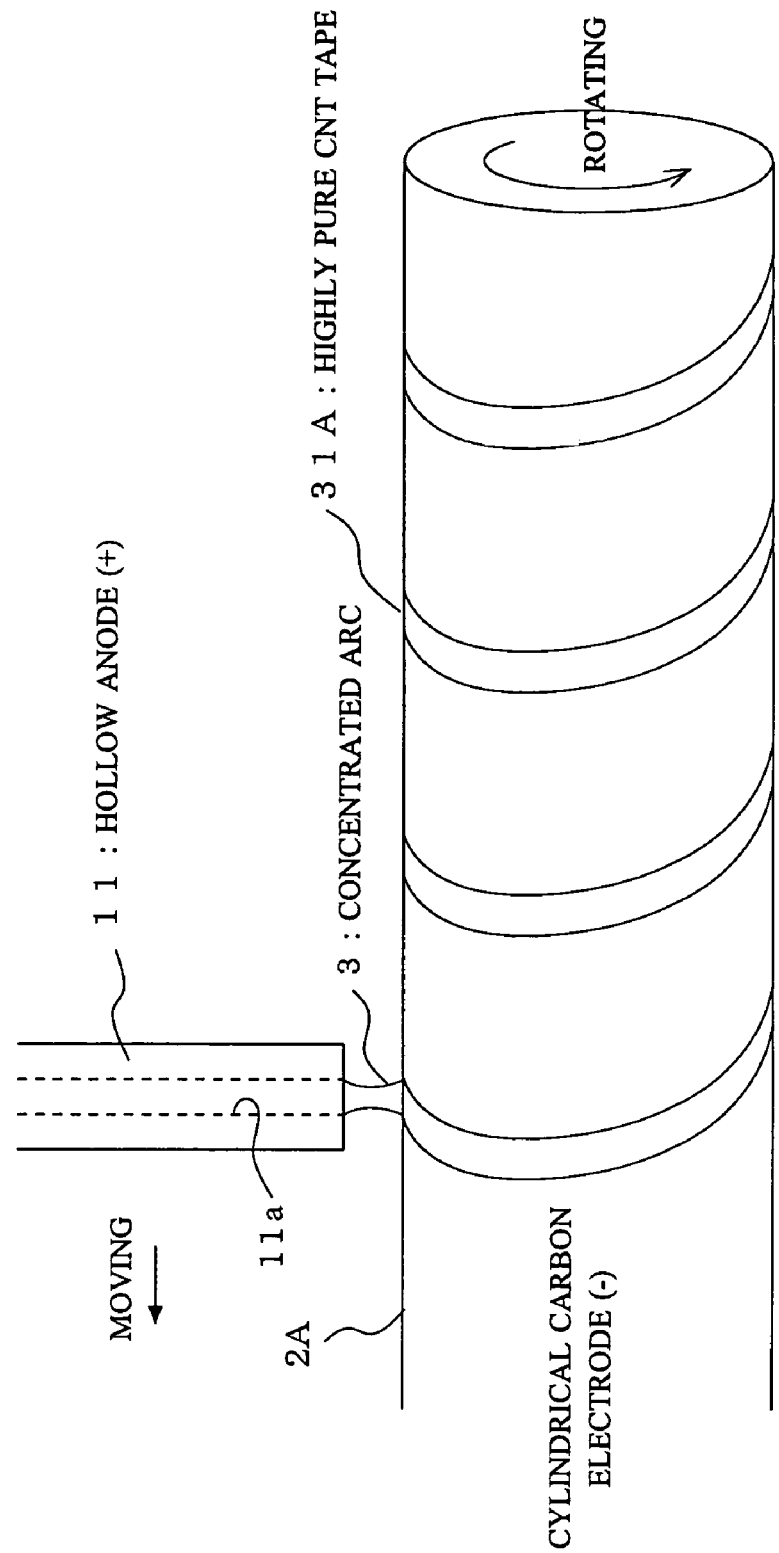
FIG. 11 is a schematic illustration showing an arc discharge between carbon material electrodes with a single anode, performed in processes for producing a tape-like material containing carbon nanotubes and for producing the carbon nanotubes according to Embodiment 5.

Turning now to FIG. 11, a process for producing a highly pure CNT tape 31A will be described. A hollow carbon electrode 11 with an outer diameter of 10 mm and an inner diameter of 4 mm was used as the anode, and a cylindrical carbon electrode 2A with a diameter of 35 mm was used as the cathode. The cathode spot was moved in a spiral on the cathode by linearly moving the hollow carbon electrode 11 in a direction of the axis of the cathode while rotating the cathode. The rotation speed of the cathode was 1.5 rpm, the speed of the horizontal movement (designated by the arrow in FIG. 11) of the hollow carbon electrode (anode) 11 was 35 mm/min, and the moving speed of the arc generation point on the cathode was about 170 mm/min. The arc discharge was performed at a current of 100 A and a voltage of 20 V (arc length: about 1 mm) in an open space (in a normal atmosphere under atmospheric pressure), using pure argon gas as the gas supplied through the hollow electrode. The flow rate of the gas was set at 1 L/min. After the arc discharge, highly pure CNT was synthesized in a tape form having a width of about 2 to 3 mm and a thickness of about 100 micron in the spiral region on the cathode where the cathode spot had been moved. The width and the thickness of the CNT tape can be varied depending on the form and size of the electrodes and synthesis conditions. FIG. 12 shows SEM photographs (a) and (b) of the resulting highly pure CNT tape. Although spherical pieces of amorphous carbon of about 1 micron are attached on the surface of the tape, the inside of the tape is constituted of aggregate of highly pure carbon nanotubes. Such an amount of amorphous carbon can be easily removed by heat treatment in an oxidizing atmosphere.

Figure 13:
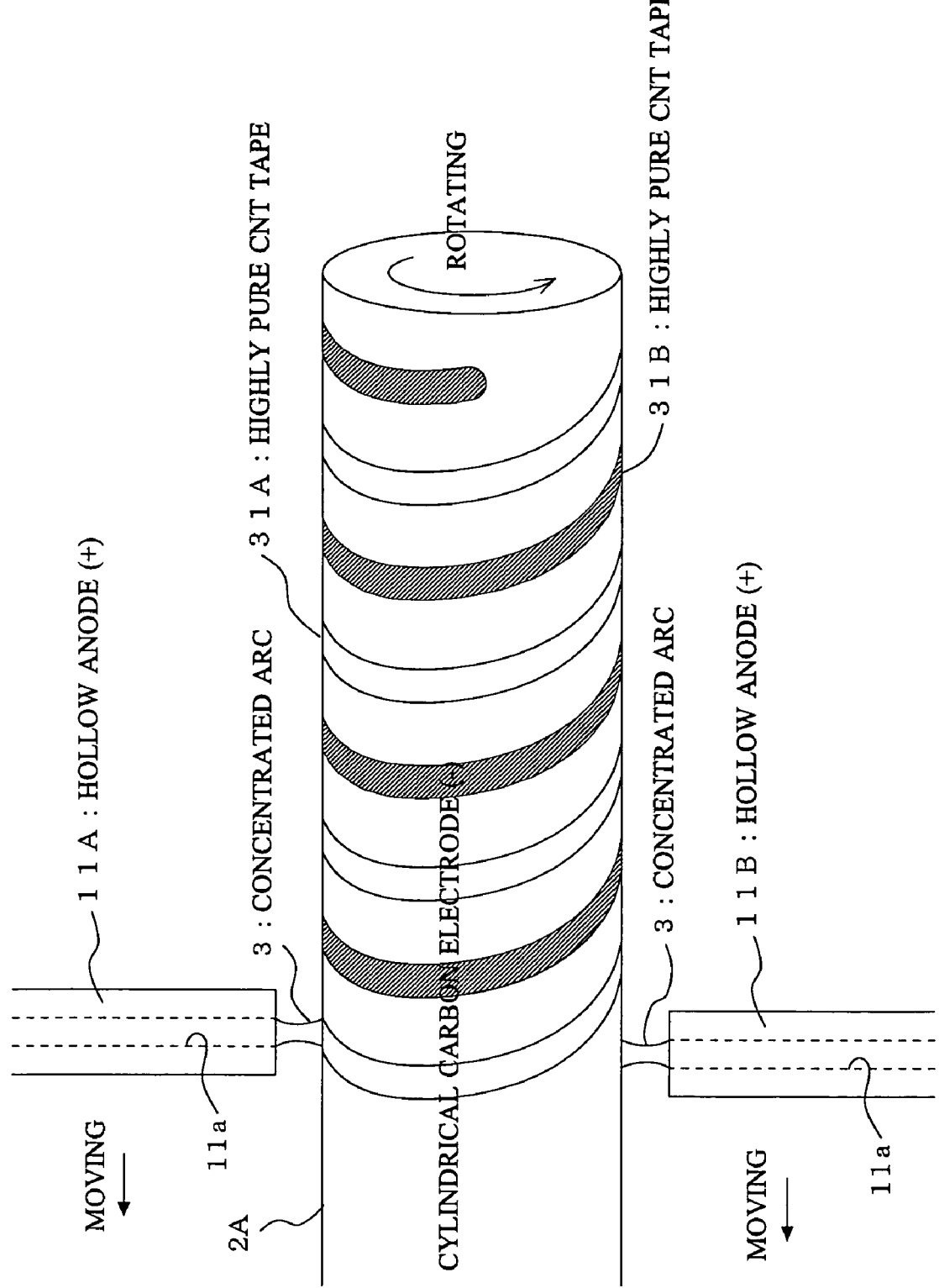
FIG. 13 is a schematic illustration showing an arc discharge between carbon material electrodes with a plurality of anodes, performed in processes for producing a tape-like material containing carbon nanotubes and for producing the carbon nanotubes according to Embodiment 5.

FIG. 13 shows a process for producing highly pure CNT tapes 31A and 31B in two lines. Hollow carbon electrodes 11A and 11B with an outer diameter of 10 mm and an inner diameter of 4 mm were used as anodes, and a single cylindrical carbon electrode 2A with a diameter of 35 mm was used as the cathode. The cathode spots were moved in spirals with the same pitch on the cathode by linearly moving the hollow carbon electrodes 11A and 11B in a direction of the axis of the cathode while rotating the cathode. The arc discharge was performed at a current of 100 A and a voltage of 20 V (arc length: about 1 mm) in an open space (in a normal atmosphere under atmospheric pressure), using pure argon gas as the gas supplied through the hollow electrodes. Each flow rate of the gas was set at 1 L/min.

While the appropriate relative moving speed of the arc generation point was about 170 mm/min in the process for producing the highly pure CNT tape using the single anode, shown in FIG. 11, as described above, it was 310 mm/min in the process for producing highly pure CNT tape using plural anodes shown in FIG. 13, and this speed was about 1.8 times as high as in the use of the single anode. This is because the two heat sources mutually influence each other, and accordingly the relative moving speed of the electrodes at which an appropriate temperature history is obtained is increased to about 1.8 times as high as that in the case of using the single anode. The increase of appropriate moving speed of the optimal arc generation point for producing the rape-like material with increasing degree of preheating or heating was observed in the below-described embodiments as well.

Various factors influencing the temperature history of the cathode surface were varied for investigation. As a result, it has been found that to realize the present invention, the appropriate relative moving speed of the arc generation point is in the range of 10 to 1,000 mm/min, preferably 50 to 500 mm/min, and more preferably 100 to 350 mm/min, and that such a range leads to a tape-like material constituted of extremely superior carbon nanotubes with a high density. Significantly slow movement at a relative moving speed of less than 10 mm/min did not lead to an appropriate range of temperature history even when various factors influencing the temperature history of the cathode surface were varied. Specifically, if an arc heat input is set so as to obtain a desired peak temperature, the speed of the subsequent cooling is significantly reduced. Consequently, the resulting carbon nanotubes are exposed to high temperature for a long time, and the purity is degraded. A relative moving speed of more than 1,000 mm/min did not also lead to an appropriate range of temperature history. For example, in order to obtain a desired peak temperature, the arc heat input per unit hour must be set large. However, a large arc heat input results in significant consumption of the anode, and thus makes long-time operation difficult. Also, the residence time around the peak temperature becomes short to reduce the thickness of the resulting carbon nanotubes, and consequently the tape-like material is not formed.

In the production process of the highly pure CNT tape with the single anode, shown in FIG. 11, arc discharge was repeatedly performed on an identical circumference of the cylindrical carbon electrode 2A being the cathode while the cathode was being rotated, with the linear movement of the hollow carbon electrode 11 suspended. In the first rotation of the cathode, carbon nanotubes were produced in a continuous tape form. However, in the second rotation and other successive rotations, carbon nanotubes were produced, but the collection rate of carbon nanotubes in tape form was dramatically reduced. This is probably because the region of the cathode corresponding to the locus of the discharge is degraded, so as to, for example, be graphitized to reduce the electrical resistivity or increase the thermal conductivity, and consequently the temperature history in the second rotation and other successive rotations largely changes, and because the surface of the cathode is oxidized in the first rotation to increase the surface roughness, and thus the resulting carbon nanotubes become difficult to peel in a tape form. On the other hand, when the hollow carbon electrode 11 was linearly moved to form a spiral locus of the arc discharge so that the cathode spot would not be formed repeatedly in the same region on the surface of the cathode, a tape of carbon nanotubes was produced and collected. Degradation and surface oxidation of the cathode material by arc discharge can occur in the vicinity of the discharge region as well. Accordingly, the interval between the loci is preferably at least 4 mm, and more preferably 8 mm or more. Thus, by relatively moving the anodes and the cathode so as not to overlap the loci of the arc discharge on the surface of the cathode, tapes of carbon nanotubes can be stably produced. Since the degradation of the cathode by heat occurs only in the surface layer, the degraded portion can be easily removed by grinding or polishing, and thus the cathode can be reused.

Figure 14:
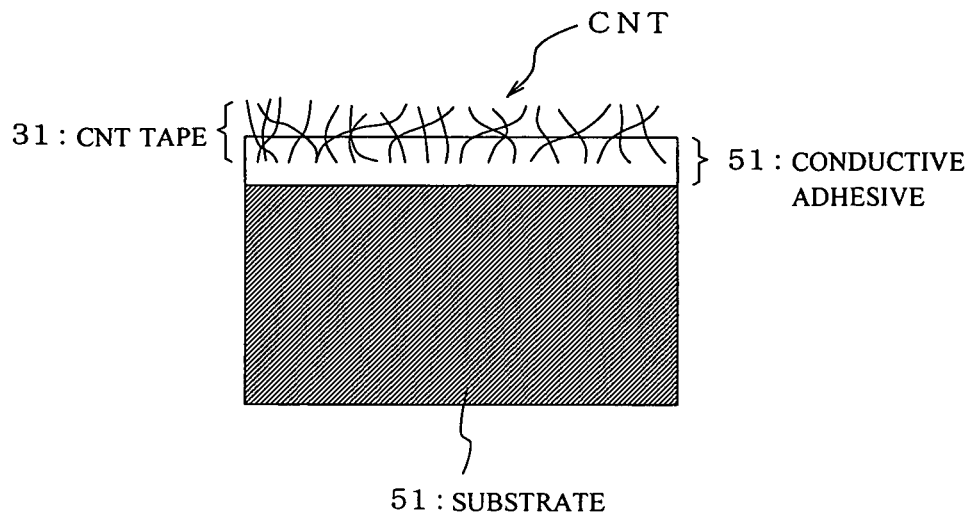
FIG. 14 is a schematic illustration of a field emission electrode including a carbon nanotube tape.
Figure 15:
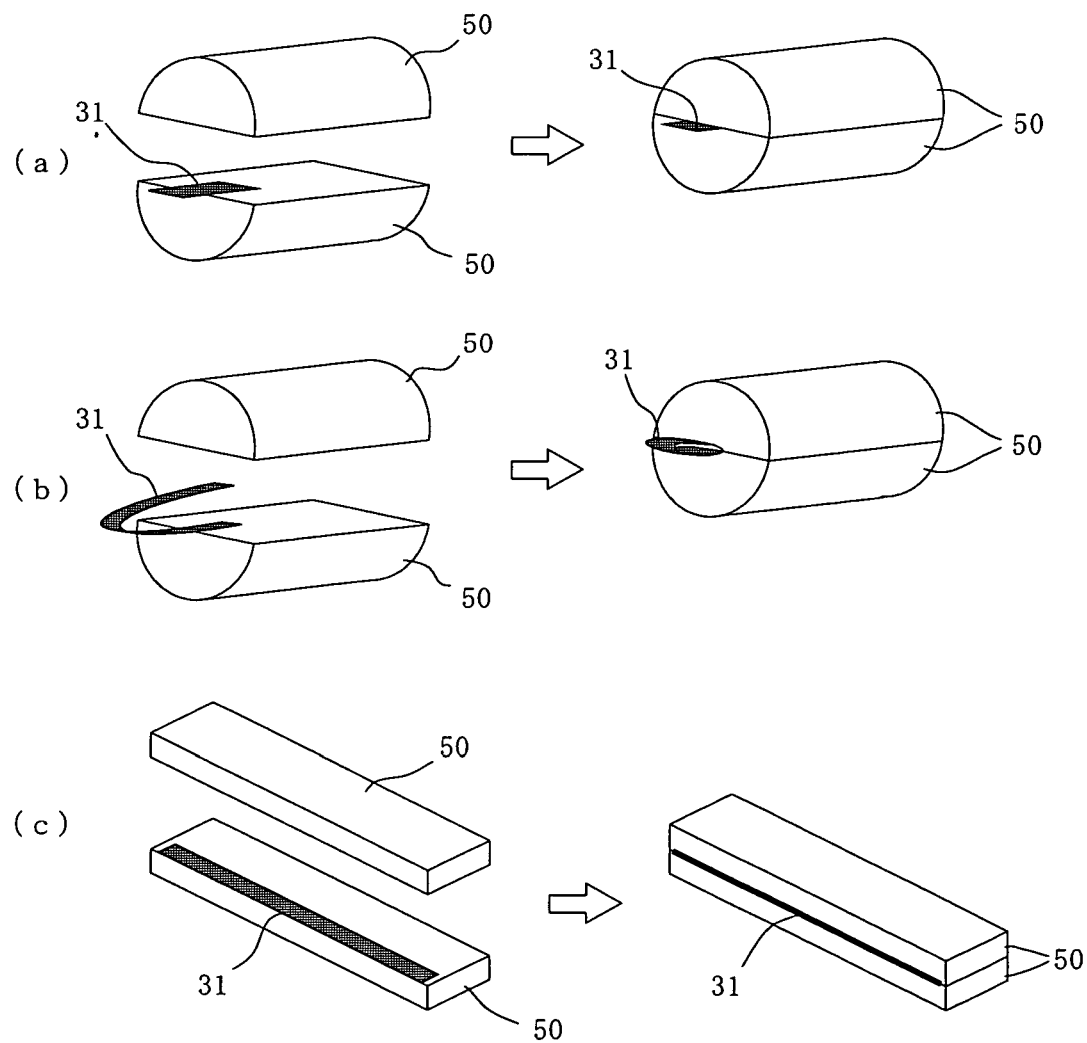
FIG. 15 shows schematic illustrations of field emission electrodes each including a carbon nanotube tape.

FIGS. 14 and 15 are schematic illustrations of field emission electrodes including the CNT tape according to the present embodiment. In a tape-like material 31 containing carbon nanotubes, the carbon nanotubes have a high purity and maintain the state just after being synthesized. Specifically, the carbon nanotubes are only in partial contact with one another and form into a uniform thin film, with their nanofibrous structure maintained. Therefore, the carbon nanotube film can be directly disposed between two substrates 50 or bonded to the substrate 50 or an electrode, and thus used as a high-performance field emission electrode. For example, the tape-like material 31 is disposed between the two substrates 50 in such as manner that an end of the tape-like material 31 protrudes. Alternatively, a conductive adhesive 51 or the like is applied onto one surface of the substrate 50 and the tape-like material 31 is bonded to the surface. Since aftertreatment, such as surface treatment, is not necessary, the number of production steps and production costs can be reduced. The conductive adhesive 51 may be a conductive paste consisting of powder of metal, such as silver, nickel, or aluminium, or graphite powder in a solvent. A high solvent content reduces the viscosity of the paste, and the paste penetrates the tape-like material 31 due to a capillary phenomenon, so that the carbon nanotubes constituting the tape gather in bundles. The carbon nanotubes aggregated in bundles at the surface of the tape cannot exhibit satisfactory field emission properties, unless some surface treating is performed. In order to prevent such a disadvantage, it is preferable that a paste having a low solvent content, that is, having a high viscosity, is used to bond the tape-like material 31. Although the paste having a high viscosity penetrates the inside of the tape to some extent, the field emission property is not affected as long as the penetration does not reach the carbon nanotubes at the surface of the tape-like material 31. The tape-like material 31 may be not only bonded with a paste, but also sandwiched between the substrates.

Thus, by using the tape-like material 31 comprising dense carbon nanotubes, a field emission electrode can be produced in which the carbon nanotubes are in a form capable of easily serving as electron sources.

FIG. 21 is a schematic illustration of a modification of the process for producing a field emission electrode including the CNT tape. In the modification, a tape-like material 110 containing carbon nanotubes is pinched between two substrates 121 and 122 and then torn, thus adhering to each of the substrates 121 and 122.

First, a tape or a sheet made of the tape-like-material 110, having a thickness of about 50 to 500 µm is disposed between a pair of substrates 121 and 122 ((a) of FIG. 21). Then, the tape-like material 110 is pinched between the substrates to apply a pressure ((b) of FIG. 21). Further, the pair of substrates 121 and 122 are separated ((c) of FIG. 21).

In this instance, the tape-like material 110 is torn into two in the thickness direction, with the two parts 111 and 112 (hereinafter referred to as torn tape-like parts) of the tape-like material adhering to the substrates 121 and 122 respectively. Specifically, the substrate 121 and the torn tape-like part 111 constitute a field emission electrode 141; the substrate 122 and the torn tape-like part 112, another field emission electrode 142.

The substrates can be made of various materials, such as conductive metals or metal compounds and nonconductive glass or resin.

Figure 22:
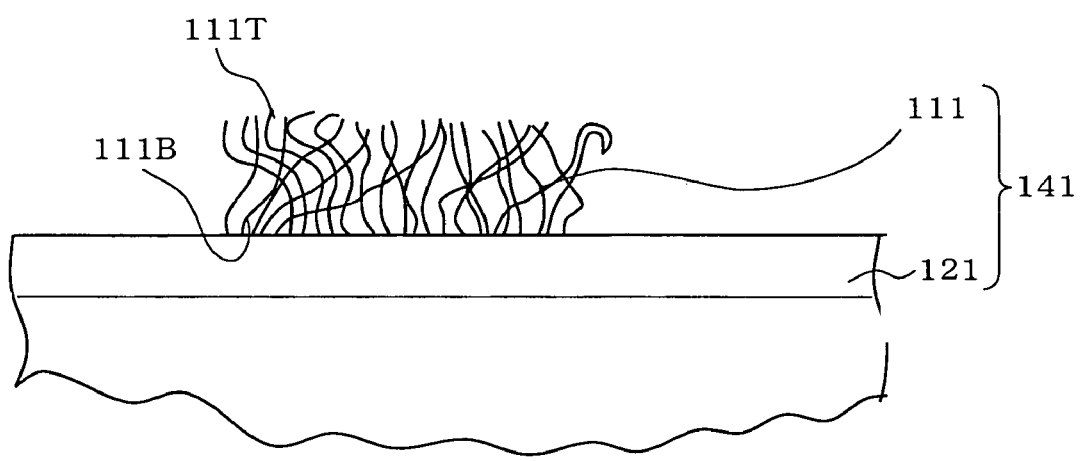
FIG. 22 is a schematic illustration of a field emission electrode produced by the production process shown in FIG. 21.

FIG. 22 is a schematic illustration of the field emission electrode produced by the production process shown in FIG. 21, and the same parts are designated by the same reference numerals.

The torn tape-like part 111 adheres to the substrate 121 (the adhering surface is designated by 111B) in such a state that carbon nanotube fibers fuzz at the surface 111T of the torn tape-like part 111 (details are described below).

Adhesion Interface

Figure 23:
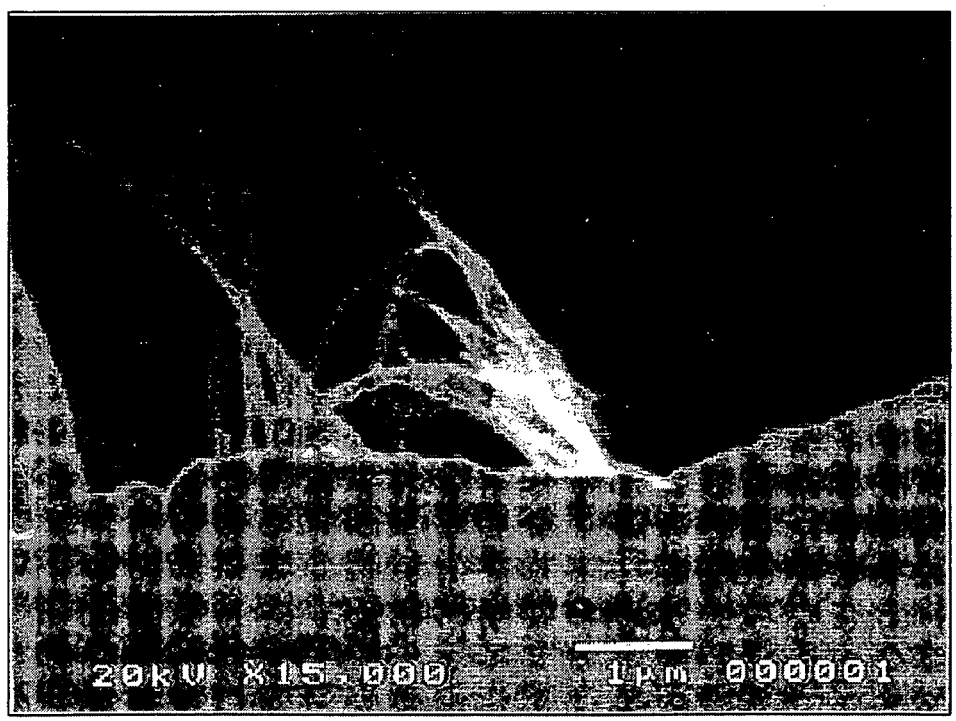
FIG. 23 is a scanning electron micrograph of the vicinity of an adhesion interface between a substrate and a torn tape-like material in the field emission electrode produced by the process shown in FIG. 21.

FIG. 23 is a scanning electron micrograph of the vicinity of the adhesion interface 111B between the substrate 121 and the torn tape-like part 111 of the field emission electrode produced by the production process shown in FIG. 21. The adhesion interface 111B was processed in such a manner that an adhesive tape was put on the torn surface 111T of the torn tape-like part 111 and then stripped off and the resulting substrate 121 was cut and ground.

It has been confirmed by elementary analysis that the white area, in the central area of the photograph, represents carbon nanotube fibers and the lower region than the white area represents the aluminium substrate. This suggests that most of the carbon nanotube fibers are left on the surface of the substrate 121 in spite of stripping with the adhesive tape.

Thus, it has been shown that the carbon nanotube fibers tightly adhere to the substrate 121 with no gap, and that adhesion between the carbon nanotube fibers and the substrate is larger than that between the carbon nanotube fibers and the adhesive tape.

In addition, although the surface of the aluminium substrate had been mirror-finished to a surface roughness of 0.1 µm or less before adhesion, the surface roughness was increased to several micrometers over the entire surface after application of pressure. This suggests that the pressure application causes microdeformation of the substrate. It is therefore assumed that the pressure application increases the contact area with and the adhesion to the carbon nanotube fibers and causes the carbon nanotube fibers to dig into the substrate, thus establishing mechanical adhesion.

Hence, it is believed that the adhesion of carbon nanotubes to the substrates 121 and 122 is ensured by: anchoring mechanism (mechanical bonding) in which pressure application causes some of carbon nanotubes to dig into the asperities on the surfaces of the substrates 121 and 122 and to be mechanically caught in the asperities to produce bonding force; anchoring effect produced by a mechanism in which surface deformation of the substrates 121 and 122 by the pressure application helps the carbon nanotubes dig into the surfaces; chemical bonding between some of the carbon atoms constituting the carbon nanotubes and the constituent atoms of the substrates 121 and 122; and physical bonding, such as van der Waals force. These forces may act singly or in combination.

Torn Surface

Figure 24:
FIG. 24 is a scanning electron micrograph of the surface of a torn part of the tape-like material used in the field emission electrode produced by the process shown in FIG. 21, the surface being viewed from above.
Figure 25:
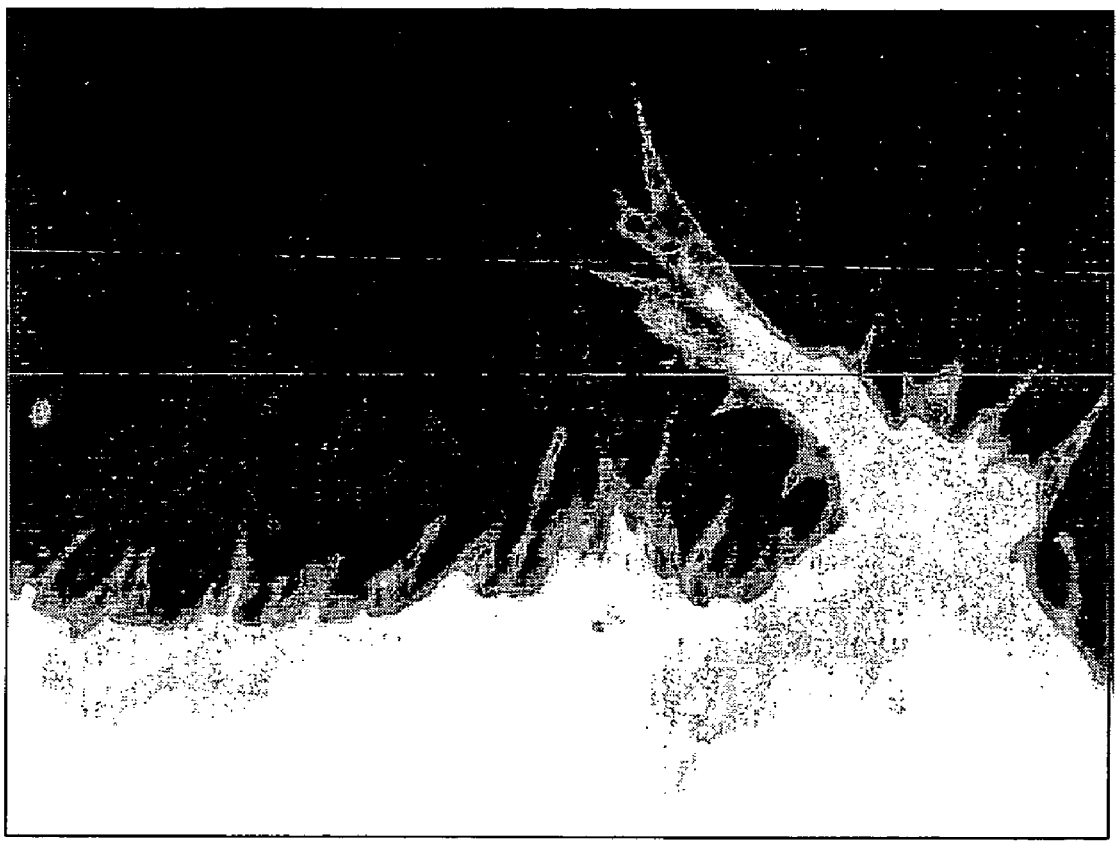
FIG. 25 is a scanning electron micrograph of a cross section of the surface of the torn part of the tape-like material used in the field emission electrode produced by the process shown in FIG. 21.

FIGS. 24 and 25 show scanning electron micrographs of the torn surface 111T of the torn tape-like part 111 produced by the process shown in FIG. 21. FIG. 24 shows the torn surface 111T viewed from above, and FIG. 25 shows a cross section of the torn surface 111T.

FIGS. 24 and 25 show feather-like patterns on the surface of a carbon nanotube fibers layer, over the surface. Also, the carbon nanotube fibers fuzz and extend toward the open space, when viewed from a side. It is therefore assumed that intertwining carbon nanotube fibers are raveled out by the above-described production process.

Hence, the carbon nanotube fibers constituting the tape-like material are intricately intertwined with one another. Since carbon nanotubes have the property of aggregating by compression, they aggregate together when pressure is applied. However, the aggregation force is lower than the adhesion to the substrate. Accordingly, by separating the substrates 121 and 122 after the pressure application, the intertwining carbon nanotube fibers adhering to the substrate 121 and 122 are raveled out (pulled) to be broken. The broken carbon nanotube fibers are probably aligned in parallel with one another in the pulling direction (perpendicular to the opposing surfaces of the substrates 121 and 122).

Hence, it is assumed that the torn surfaces 111T and 112T become fuzzy after the separation because of long and intricately intertwining carbon nanotube fibers constituting the tape-like material 110.

Consequently, the resulting field emission electrode ensures conductivity of the adhering surface 111B or 112B of the torn tape-like part 111 or 112 to the substrate 121 or 122, and exhibits superior electron emission property at the torn surface 111T or 112T, and such a field emission electrode can be easily produced.

The field emission electrode can be installed, in the torn state, into an electric and electronic apparatus. Thus, by using the tape-like material containing dense carbon nanotube fibers, a field emission electrode can be easily produced in which the carbon nanotubes are bonded in such a state that the carbon nanotubes readily function as electron sources.

Figure 26:
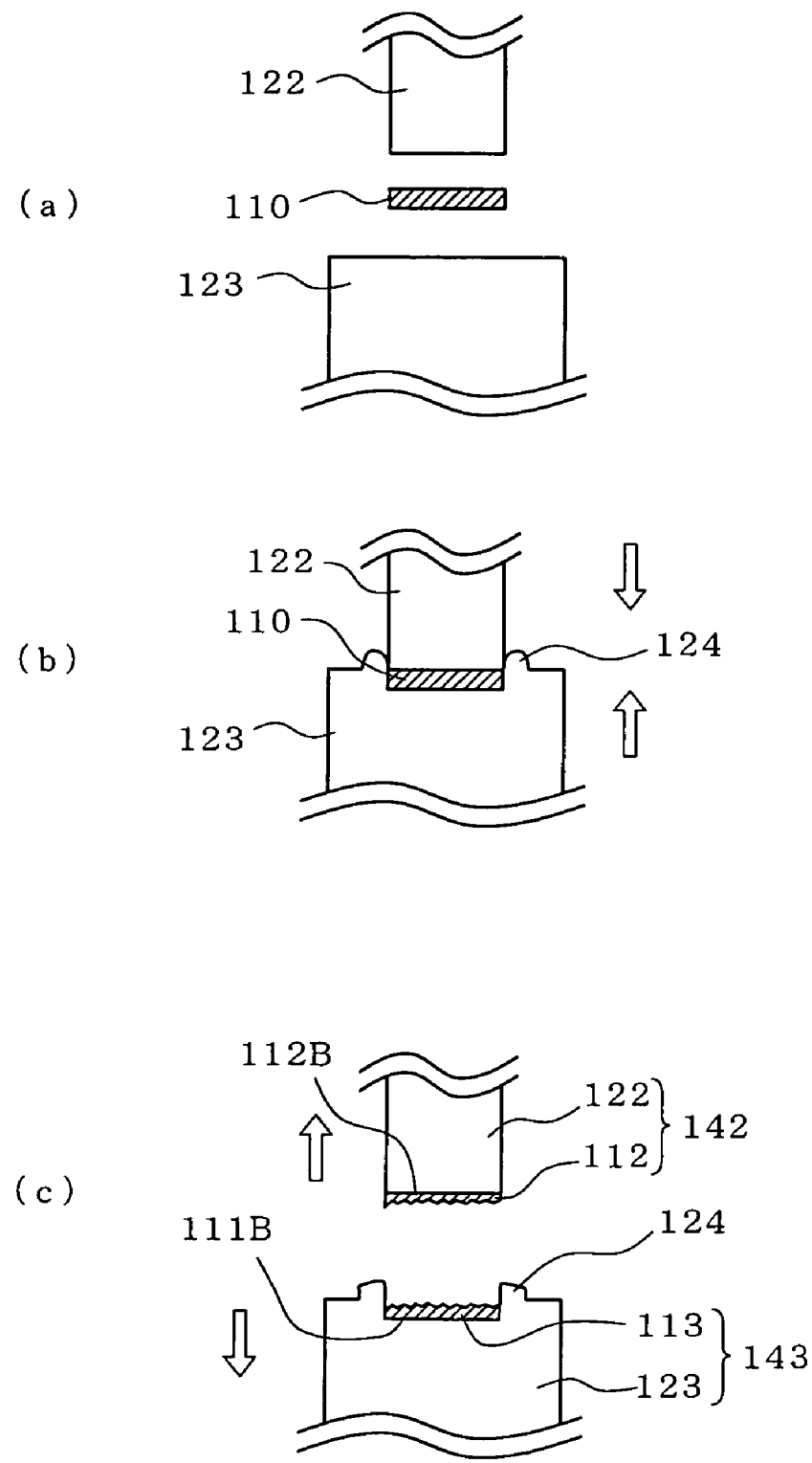
FIG. 26 is a schematic illustration of an modification of the process for producing a field emission electrode including a carbon nanotube tape.

FIG. 26 is a schematic illustration of another modification of the process for producing a field emission electrode including the CNT tape, and the same parts as in FIG. 21 are designated by the same reference numerals.

In the modification also, basically, the tape-like material 110 containing carbon nanotubes is pinched between two substrates 122 and 123 and then torn, thus adhering to each of the substrates 121 and 123. However, in this modification, one substrate 123 is more deformable than the other substrate 122 (the former substrate 123 hereinafter referred to as the deformable substrate). First, the tape-like material 110 is disposed between the substrate 122 and the deformable substrate 123 ((a) of FIG. 26). Then, the tape-like material 110 is pinched between the substrates to apply a pressure ((b) of FIG. 26). Further, the substrate 122 and the deformable substrate 123 are separated ((c) of FIG. 26).

In this instance, the tape-like material 110 is torn into two in the thickness direction, with the torn tape-like parts 112 and 113 adhering to the substrate 122 and the deformable substrate 123 respectively.

Specifically, the substrate 122 and the torn tape-like part 112 constitute a field emission electrode 142; the deformable substrate 123 and the torn tape-like part 113, a tape-like material-adhering deformable substrate 143.

Since the surface of the deformable substrate 123 is deformed by pressure, a protuberance 124 is formed around the torn tape-like part 113 on the surface of the tape-like material-adhering deformable substrate 143. This suggests that a plastic flow occurs in the deformable substrate 123, and that the plastic flow allows pressure to uniformly act over the entire surface of the opposing substrate 122. Consequently, the adhering surface 112B of the carbon nanotubes becomes more uniform without variation in adhesion.

In particular, even if the surface of the substrate 122 is not completely smooth, pressure can be uniformly placed on both relatively protruding areas and relatively recessed areas of the surface to establish uniform adhesion. Consequently, the adhering surface 112B is not striped at all from the surface of the substrate 122 when the substrate is separated. Thus, uniform adhesion is ensured at the adhering surface 112B.

In the tape-like material 110, the surface opposed to the anode during arc discharge has a higher adhesion to the substrate than the surface opposed to the cathode (the cathode side of the tape-like material is contaminated with the carbon material of the cathode to some extent, and thus the purity of the carbon nanotubes on the cathode side is lower than that on the anode side). Also, the deformable substrate 123 having larger deformability exhibits higher adhesion than the substrate 122. Accordingly, by opposing the surface on the anode side of the tape-like material 110 to the substrate 122, and opposing the surface on the cathode side to the deformable substrate 123, adhesion at both surfaces can be substantially equal (or the difference in adhesion between both surfaces becomes small). Thus, the adhering surface 112B of the carbon nanotubes becomes more uniform without variation in adhesion to the substrate 122.

The substrate 122 can be made of various materials, such as conductive metals or metal compounds and nonconductive glass or resin.

For example, the substrate 122 may be a stainless disk (for example, of 5 mm in diameter), and, in this instance, the deformable substrate 123 may be an indium block. Use of lead, solder, aluminium, or the like, also, produced a similar effect.

FIG. 27 is a schematic illustration of another modification of the process for producing a field emission electrode including the CNT tape, and the same parts as in FIG. 26 are designated by the same reference numerals.

In this modification, the substrate 122, the deformable substrate 123, and the tape-like material 110 have substantially the same shape in plan view, as shown in (a) of FIG. 27, and they are placed in a through-hole of a female die 150 (serving as a die) having the same plan view as the former plan view.

Then, the deformable substrate 123 in the female die 150 is pressed with a punch 160, as shown in (b) of FIG. 27. In this instance, since the deformable substrate 123 is constrained by the female die 150 and cannot be deformed outward, pressure is reliably applied to the tape-like material 110.

Then, the substrate 122 and the deformable substrate 123 are separated, as shown in (c) of FIG. 27. Thus, the substrate 122 and the torn tape-like part 112 adhering to the substrate 122 constitute a field emission electrode 142, as in the above-described FIG. 26; the deformable substrate 123 and the torn tape-like part 113 adhering to the deformable substrate 123, a tape-like material-adhering deformable substrate 143.

By placing, in the female die 150 having a through-hole, the tape-like material 110 disposed between the substrate 122 and the deformable substrate 123, which have the same shape in plan view, and subsequently pressing them with the punch 160, uniform adhesion can be established without outward deformation or surface protuberance of the deformable substrate 123 resulting from pressure application. In general, separation is performed outside the female die 150.

FIG. 28 shows comparison in field emission property between a field emission electrode according to the present invention and a known field emission electrode. For the comparison, impressed voltages for obtaining a predetermined current density (10 mA/cm$^2$) under vacuum were compared, using the field emission electrode as a cathode at a distance from an anode of 0.1 mm.

The field emission electrode of the present invention showed that the impressed voltage for obtaining a predetermined current density decreased dramatically in comparison with the known electrode. Thus, it has been found that the field emission electrode of the invention has an extremely high field emission property.

Specifically, the impressed voltage of a field emission electrode in which a past containing carbon nanotube powder was printed was 680 V; the impressed voltage of a field emission electrode to which the tape-like material was bonded was 440 V. Furthermore, in field emission electrodes produced by pinching the material between substrates and between a substrate and a deformable substrate, the impressed voltages were 210 V and 192 V, respectively. Thus, it has been confirmed that they have an improved field emission property.

Embodiment 6

The fundamental principle of the processes for producing the tape-like material containing carbon nanotubes and for producing the carbon nanotubes according to Embodiment 6 of the present invention is the same as that described with reference to FIG. 4. In the present embodiment, the arc generation point on the surface of the cathode is moved by relatively moving the anode and the cathode.

The processes for producing a tape-like material containing carbon nanotubes and for producing the carbon nanotubes according to the present embodiment uses the same hollow electrode 11 as the anode in Embodiment 5, having a bore 11a around its axis and acting as the carbon material anode shown in FIG. 4, and is characterized in that a catalyst container 22 containing metal or metal compound powder 21 as a catalyst is connected to the bore 11a of the hollow electrode 11, and arc discharge is performed in an open space (in a normal atmosphere under atmospheric pressure) while a small amount of inert gas, such as argon gas, or inert gas-containing mixed gas is jetted onto the cathode 2 through the catalyst container 22 and the bore 11a of the hollow electrode 11 together with the metal or metal compound powder catalyst 21, and further while the hollow electrode 11 is relatively moved with respect to the carbon cathode 2.

In the present embodiment, pure argon or a mixed argon gas containing about 5% of hydrogen or helium gas was used as the gas supplied through the bore 11a of the hollow electrode 11. In particular, by mixing several percent to tens of percent of hydrogen gas to argon, the yield of carbon nanotubes was increased without adversely affecting the stability of the arc. As described above, this is probably because hydrogen gas can prevent the sublimed carbon over the electrode from growing to clusters, thus helping to create conditions for easily synthesizing carbon nanotubes on the cathode.

In the present embodiment, as in Embodiment 5, the appropriate gas flow rate depends on the cross section of the bore 11a of the hollow electrode 11, and is preferably in the range of 10 to 400 mL/min per square millimeter of cross section of the bore 11a. By appropriately setting the flow rate of the gas, the gas can function as plasma gas and create conditions under which arc discharge occurs in the central area of the anode rather than its surroundings. Consequently, the cathode spot can be concentrated so that highly pure carbon nanotubes are efficiently produced.

Although any catalytic material can be used as the metal or metal compound powder, the present embodiment uses Fe, Ni, Co, FeS, and so forth singly or in combination.

In the present embodiment also, since the inert gas or inert gas-containing mixed gas is jetted to the arc 3 through the bore 11a of the hollow electrode 11, the conductivity in the gas flow path increases more than that in its surroundings because the degree of ionization of the inert gas or inert gas-containing mixed gas increases at a high temperature by arc discharge. Also, the anode spot is stably formed at the internal surface of the hollow electrode, and thus the generated arc is constrained to be along the gas flow path.

In addition, in the present embodiment, the metal or metal compound powder catalyst 21 is delivered along with the gas stream, and the catalyst is superfinely atomized by arc heat. The atomized catalyst particles serve as the nucleus from which single-walled carbon nanotubes grow. Specifically, highly pure single-walled carbon nanotubes can be produced in and around the position (central area of the arc) where a fixed cathode spot is formed. Then, by performing arc discharge while moving the hollow electrode 11, the tape-like material 31 containing highly pure single-walled carbon nanotubes was produced in the region of the cathode where the center of the arc 3 (cathode spot) runs, as described with reference to FIG. 9.

Embodiment 7

Figure 16:
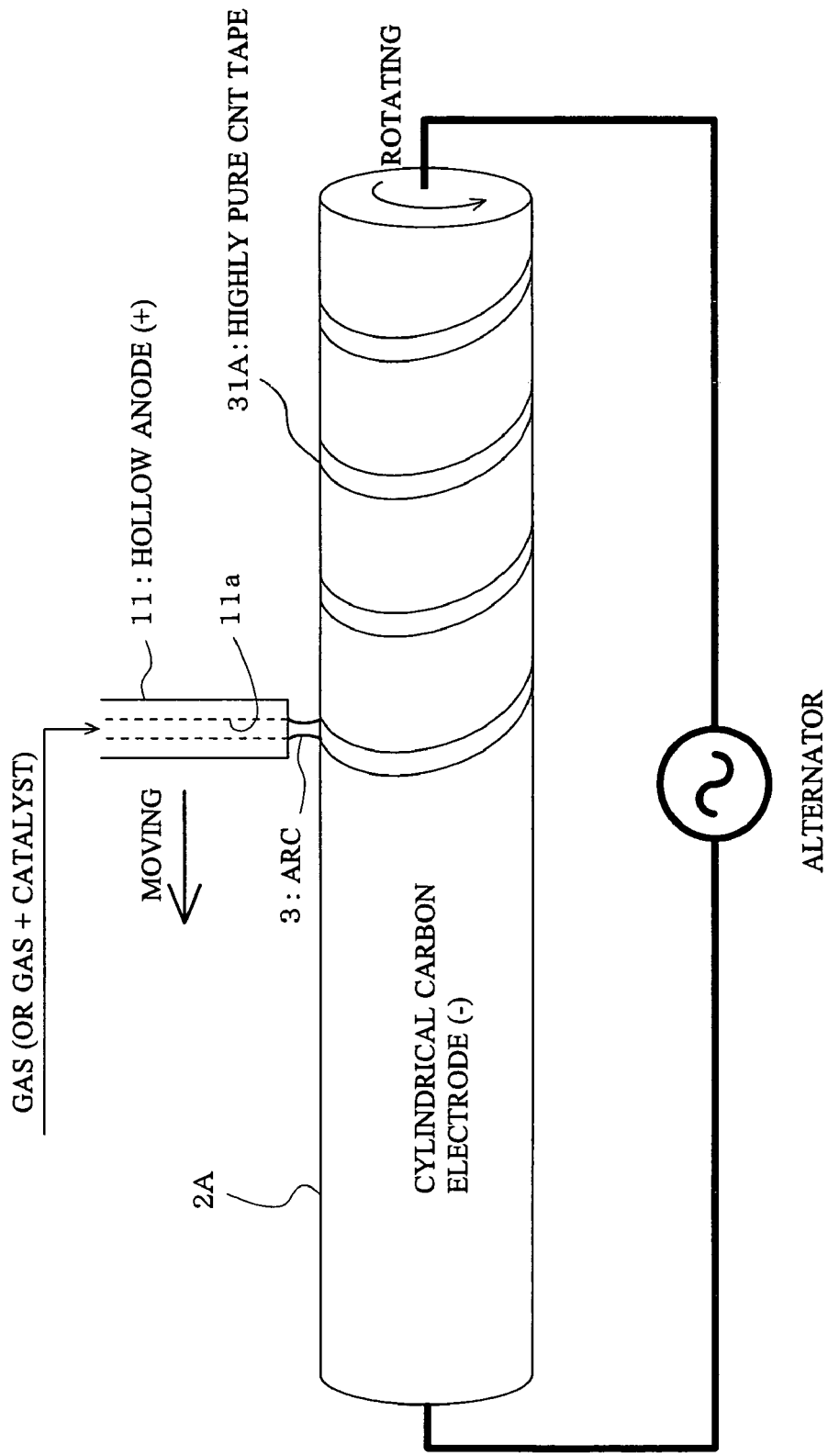
FIG. 16 is a schematic illustration showing a carbon cathode heating method in processes for producing a tape-like material containing carbon nanotubes and producing the carbon nanotubes according to Embodiment 7 of the present invention.

FIG. 16 illustrates processes for producing a tape-like material containing carbon nanotubes and for producing the carbon nanotubes according to Embodiment 7 of the present invention. In the figure, the same parts as in FIG. 11 for Embodiment 5 are designated by the same reference numerals.

It is considered that in the synthesis of carbon nanotubes by arc discharge, principally, carbon vapor and carbon ions generated from the carbon anode are diffused to the cathode side and condensed on the surface of the cathode having a lower temperature than the anode, thereby producing carbon nanotubes (particularly multi-walled carbon nanotubes). Therefore, in general, the lower the cathode temperature is, the higher the growing speed of carbon nanotubes is, and the cathode is not necessarily formed of carbon material as long as it is heat-resistant and conductive.

The inventors, however, has found through their experiments that the synthesis ratio of carbon nanotubes cannot be increased only by increasing carbon vapor and carbon ions from the anode, and that in order to produce highly pure carbon nanotubes, it is important to maintain the temperature of the cathode, on which carbon nanotubes are produced, in an appropriate range. Specifically, it has been confirmed that by energizing the entire cathode 2A to heat with another power supply (ac power source), as shown in FIG. 16, with the same electrodes and under the same conditions as in Embodiment 5 or 6, before arc discharge, a tape-like material containing highly pure carbon nanotubes can be synthesized with cathode spot temperature higher than that in the case where preheating is not performed.

Thus, in order to synthesize highly pure carbon nanotubes in a high yield, it is advantageous to increase the temperature of the cathode spot to some extent. Generally used carbon electrodes have an electrical resistivity (specific resistance) of about 500 to 2,000 μΩ·cm. If a carbon material with an electrical resistivity of 4,000 μΩ·cm or more is used as the cathode, the current density increases in the vicinity of the cathode spot of the cathode during arc discharge, and consequently the temperature in the vicinity of the cathode spot increases because of heat generation due to the electrical resistance. Thus, the same effect as in the case of heating the cathode is produced, and accordingly highly pure carbon nanotubes can be produced in a high yield.

Generally used carbon electrodes have a thermal conductivity of 50 to 200 W/m·K. There is a substantially negative correlation between the electrical resistivity and the thermal conductivity of the carbon material. Specifically, a material having a higher electrical resistivity has a lower thermal conductivity and conducts heat less, and consequently the temperature of the vicinity of the cathode spot is increased. A carbon material with an electrical resistivity of 4,000 μΩ·cm or more has a thermal conductivity of about 40 W/m·K or less.

Embodiment 8

Figure 17:
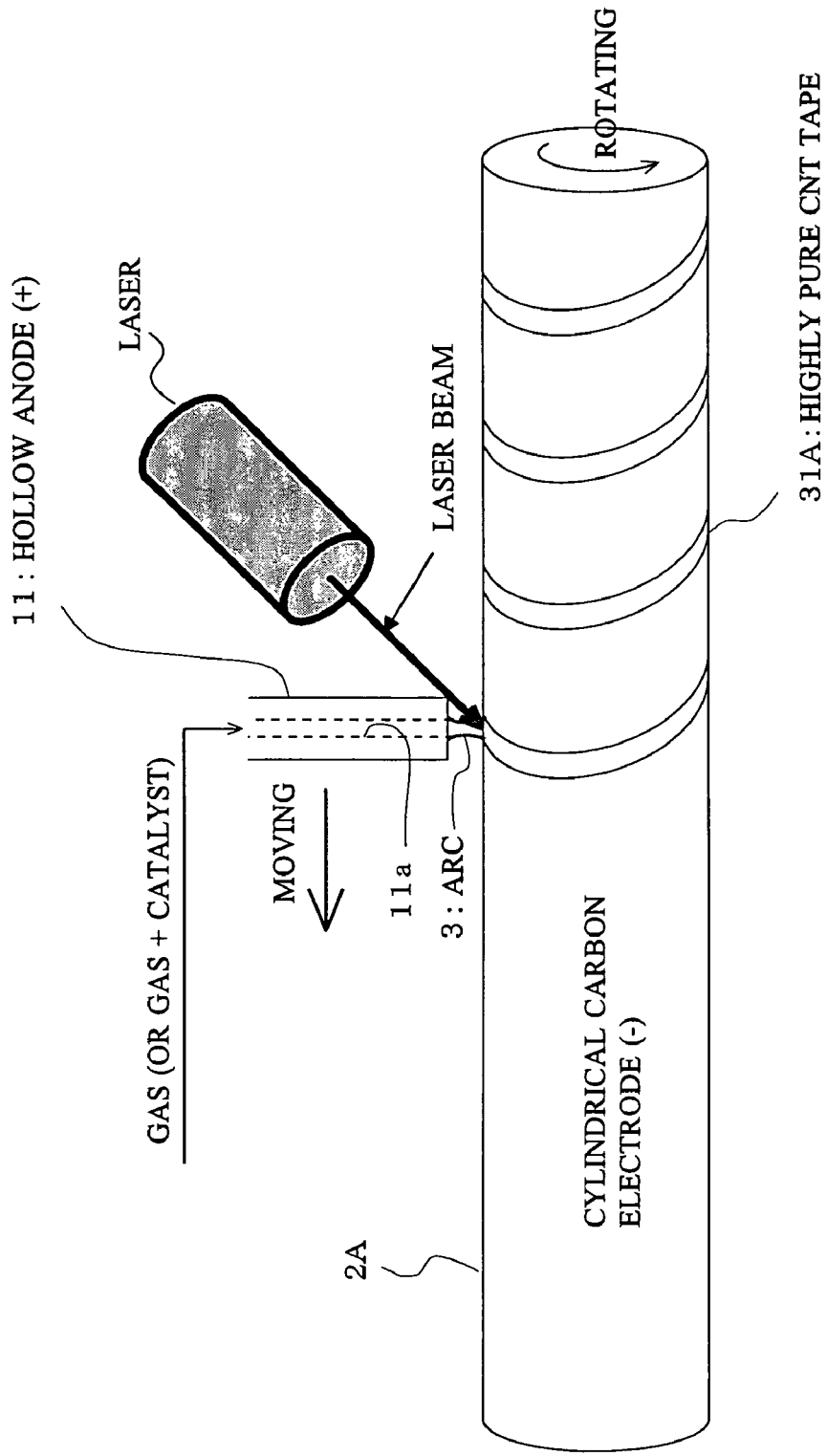
FIG. 17 is a schematic illustration showing a carbon cathode heating method in processes for producing a tape-like material containing carbon nanotubes and producing the carbon nanotubes according to Embodiment 8 of the present invention.

FIG. 17 illustrates processes for producing a tape-like material containing carbon nanotubes and for producing the carbon nanotubes according to Embodiment 8 of the present invention. In the figure, the same parts as in FIG. 11 for Embodiment 5 are designated by the same reference numerals.

In the processes for producing a tape-like material containing carbon nanotubes and for producing the carbon nanotubes of the present embodiment, arc discharge is performed with the same electrode and under the same conditions as in the foregoing Embodiment 5 or 6 while the cathode spot of the arc 3, or the front portion of the arc in the arc track on the cathode 2A is heated by a laser beam from a laser, as shown in FIG. 17.

In the present embodiment also, the temperature of the cathode spot can be increased higher than that in the case where heating is not performed, and the resulting tape-like material contains highly pure carbon nanotubes.

Embodiment 9

Figure 18:
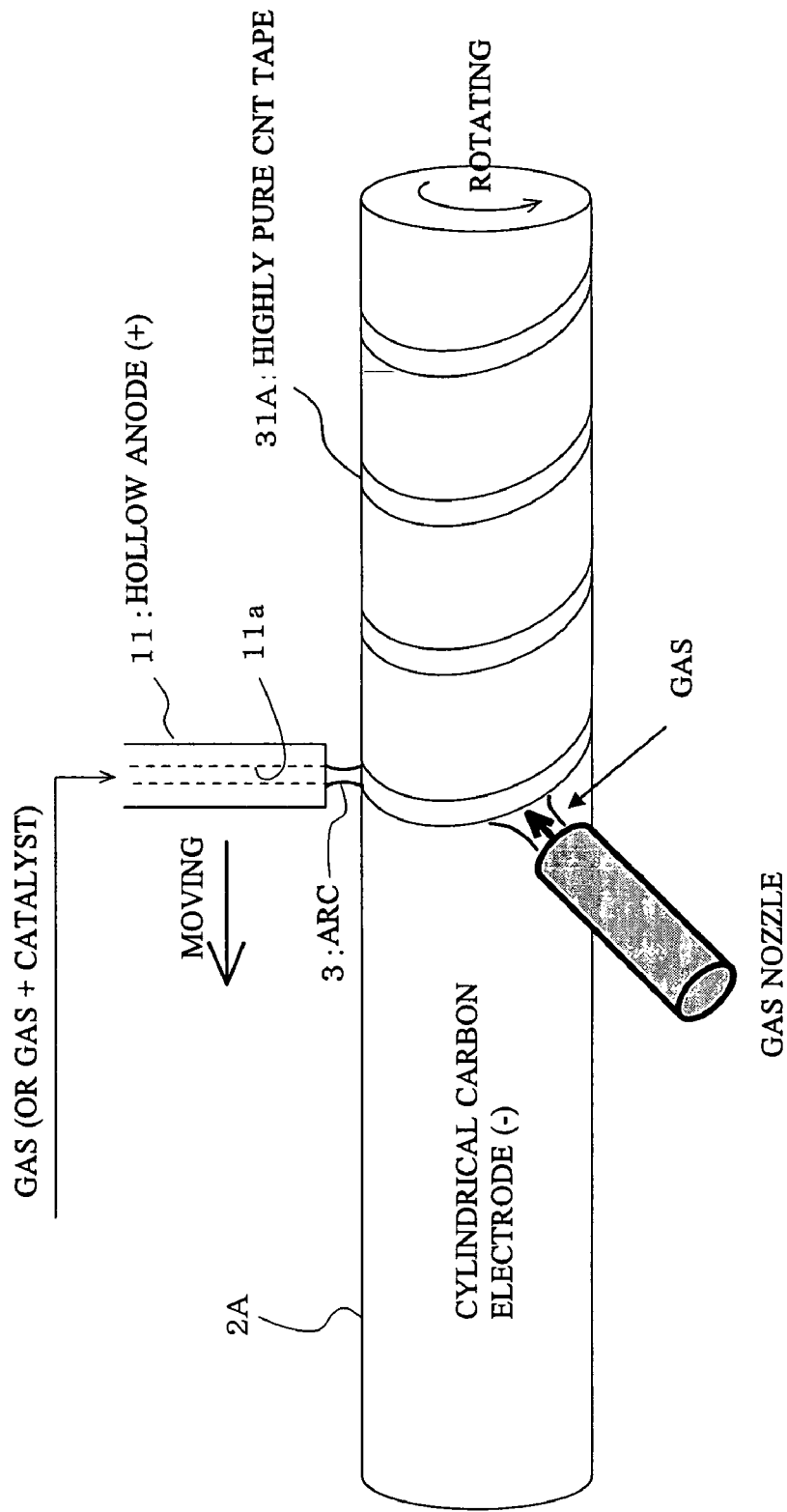
FIG. 18 is a schematic illustration showing a product-cooling method in processes for producing a tape-like material containing carbon nanotubes and producing the carbon nanotubes according to Embodiment 9 of the present invention.

FIG. 18 illustrates processes for producing a tape-like material containing carbon nanotubes and for producing the carbon nanotubes according to Embodiment 9 of the present invention. In the figure, the same parts as in FIG. 11 for Embodiment 5 are designated by the same reference numerals.

In the processes for producing a tape-like material containing carbon nanotubes and for producing the carbon nanotubes of the present embodiment, a gas is jetted from a gas nozzle onto the product or highly pure CNT tape 3A produced on the locus of the cathode spot of the arc 3, with the same electrodes and under the same conditions as in the foregoing Embodiment 5 or 6, as shown in FIG. 18.

By jetting the gas onto the tape-like material to cool the product after the product is produced, the separation of the tape-like material can be promoted. Any cooling gas except combustible gas, such as air or nitrogen, can be used as the jetting gas. The tape-like material is produced in a thin film on the cathode 2A. By jetting the gas onto the thin film, the temperature of the film more rapidly decreases than that of the cathode 2A, so that thermal stress occurs between the tape-like material and the cathode. Thus, peeling significantly proceeds.

In addition, if the jetting gas contains oxygen, or if jetting gas does not contain oxygen, but is jetted in a normal atmosphere, air is mixed with the gas to some extent by jetting the gas, and thus helps to oxidize or burn thin film or particles of polycrystalline graphite and amorphous carbon attached to the both surfaces of the tape-like material. Consequently, the purity of the carbon nanotubes in the tape-like material is increased, and the adhesion between the cathode and the tape-like material is weakened so that the peeling of the tape-like material proceeds.

The adhesion between the cathode and the tape-like material also depends on the arithmetic average surface roughness (Ra) of the cathode. Specifically, a high surf-ace roughness of the cathode material (arithmetic average surface roughness (Ra) of 4.0 μm or more) increase the adhesion between the cathode and the tape-like material, so that peeling does not occur easily. Accordingly, by setting the arithmetic average surface roughness (Ra) of the carbon material serving as the cathode at 3.2 μm or less, the adhesion between the cathode and the tape-like material is weakened so that the peeling occurs naturally due to thermal stress. Thus, the tape-like material can be easily collected.

The invention claimed is:

1. A process for producing carbon nanotubes by arc discharge, wherein a path of the arc discharge is formed along the stream of an inert gas or inert gas-containing mixed gas supplied from an anode to a cathode comprising a carbon material, and simultaneously, the anode and the cathode are relatively moved so as to move a cathode spot of an arc on the cathode.

2. A process for producing carbon nanotubes by arc discharge, wherein an arc is generated while an inert gas or an inert gas-containing mixed gas is jetted onto a cathode comprising a carbon material from the inside of a hollow electrode used as an anode, and simultaneously, the anode and the cathode are relatively moved so as to move a cathode spot of the arc on the cathode.

3. A process for producing carbon nanotubes by arc discharge, wherein an arc is generated while an inert gas or an inert gas-containing mixed gas is jetted together with a metal powder or metal compound powder serving as a catalyst onto a cathode comprising a carbon material from the inside of a hollow electrode used as an anode, and simultaneously, the anode and the cathode are relatively moved so as to move a cathode spot of the arc on the cathode.

4. The process for producing carbon nanotubes according to claim 1, wherein the cathode spot of the arc is relatively moved on the surface of the cathode material at a speed in the range of 10 to 1,000 mm/mm, by relatively moving the anode and the cathode.

5. The process for producing carbon nanotubes according to claim 1, wherein the arc discharge is performed in a normal atmosphere.

6. The process for producing carbon nanotubes according to claim 2, wherein the gas flow rate of the inert gas or inert gas-containing mixed gas jetted onto the cathode from the inside of the hollow electrode is in the range of 10 to 400 mL/min per square millimeter of cross section of the bore of the hollow electrode.

7. The process for producing carbon nanotubes according to claim 1, wherein argon or a mixture of argon gas and hydrogen gas is used as the inert gas or inert gas-containing mixed gas.

8. The process for producing carbon nanotubes according to claim 1, wherein the anode and the cathode are relatively moved so that the arc generation point on the surface of the cathode has a substantially constant temperature history, except for positions of arc generation start and termination.

9. The process for producing carbon nanotubes according to claim 1, wherein the cathode spot is moved so as not to be formed repeatedly in the same region on the surface of the cathode.

10. The process for producing carbon nanotubes according to claim 1, wherein arc discharge is performed while the entire cathode, the cathode spot of the arc, or the front portion of an arc in an arc track on the cathode is heated.

11. The process for producing carbon nanotubes according to claim 1, wherein the cathode electrode comprises a carbon material having an electrical resistivity of 4,000 $\mu\Omega\cdot cm$ or more, or a thermal conductivity of 40 W/m·K or less.

12. The process for producing carbon nanotubes according to claim 1, wherein a carbon material having an arithmetic average surface roughness (Ra) of 3.2 μm or less is used as the cathode.

13. The process for producing carbon nanotubes according to claim 1, wherein the carbon nanotubes are produced in a synthesis in which a gas is jetted onto a product produced on the locus of the cathode spot of the arc in a cooling step immediately after arc discharge.

14. The process for producing carbon nanotubes according to claim 1, wherein the carbon nanotubes constitute an aggregate in a tape form.

* * * * *